US006931590B2

(12) United States Patent
Kanie et al.

(10) Patent No.: US 6,931,590 B2
(45) Date of Patent: Aug. 16, 2005

(54) METHOD AND SYSTEM FOR MANAGING DOCUMENTS

(75) Inventors: Yukie Kanie, Kawasaki (JP); Toru Takahashi, Kamakura (JP); Yuki Aoyama, Sagamihara (JP); Yasuki Itou, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 923 days.

(21) Appl. No.: 09/761,853

(22) Filed: Jan. 18, 2001

(65) Prior Publication Data

US 2002/0002567 A1 Jan. 3, 2002

(30) Foreign Application Priority Data

Jun. 30, 2000 (JP) ........................................ 2000-203063

(51) Int. Cl.⁷ ............................................. G06F 17/21
(52) U.S. Cl. ....................... 715/511; 715/513; 715/526; 715/515
(58) Field of Search ................................ 715/511, 513, 715/526, 515; 345/751, 759

(56) References Cited

U.S. PATENT DOCUMENTS

| | | | | | |
|---|---|---|---|---|---|
| 5,659,676 | A | * | 8/1997 | Redpath | 715/515 |
| 5,664,208 | A | * | 9/1997 | Pavley et al. | 715/515 |
| 5,761,684 | A | * | 6/1998 | Gibson | 715/515 |
| 5,805,889 | A | * | 9/1998 | Van De Vanter | 717/107 |
| 5,890,177 | A | * | 3/1999 | Moody et al. | 715/511 |
| 6,094,657 | A | * | 7/2000 | Hailpern et al. | 707/103 R |
| 6,351,753 | B1 | * | 2/2002 | Jagadish et al. | 707/203 |
| 6,405,225 | B1 | * | 6/2002 | Apfel et al. | 715/526 |
| 6,493,732 | B2 | * | 12/2002 | Aoyama et al. | 715/511 |
| 6,560,620 | B1 | * | 5/2003 | Ching | 715/511 |

FOREIGN PATENT DOCUMENTS

| | | | |
|---|---|---|---|
| JP | 8-329079 | * | 12/1996 |
| JP | 9-319632 | * | 12/1997 |

* cited by examiner

Primary Examiner—Stephen Hong
Assistant Examiner—Matthew Ludwig
(74) Attorney, Agent, or Firm—Mattingly, Stanger, Malur & Brundidge, P.C.

(57) ABSTRACT

The present invention extracts common portions each composed of a structure and text character strings included commonly in both an original version and a revised version of a structured document, and difference portions specific to either the original version or the revised version. Based on the extraction results from the above two version documents, the present invention creates a multi-version document having version description tags attached thereto. When a further-revised version is created, the present invention performs the above process on the latest version included in the created multi-version document and the further-revised version to create a new multi-version document. By using the created multi-version document, it is possible to collectively display changes made to all the versions as well as to display the change history of a portion to which each change was made.

14 Claims, 29 Drawing Sheets

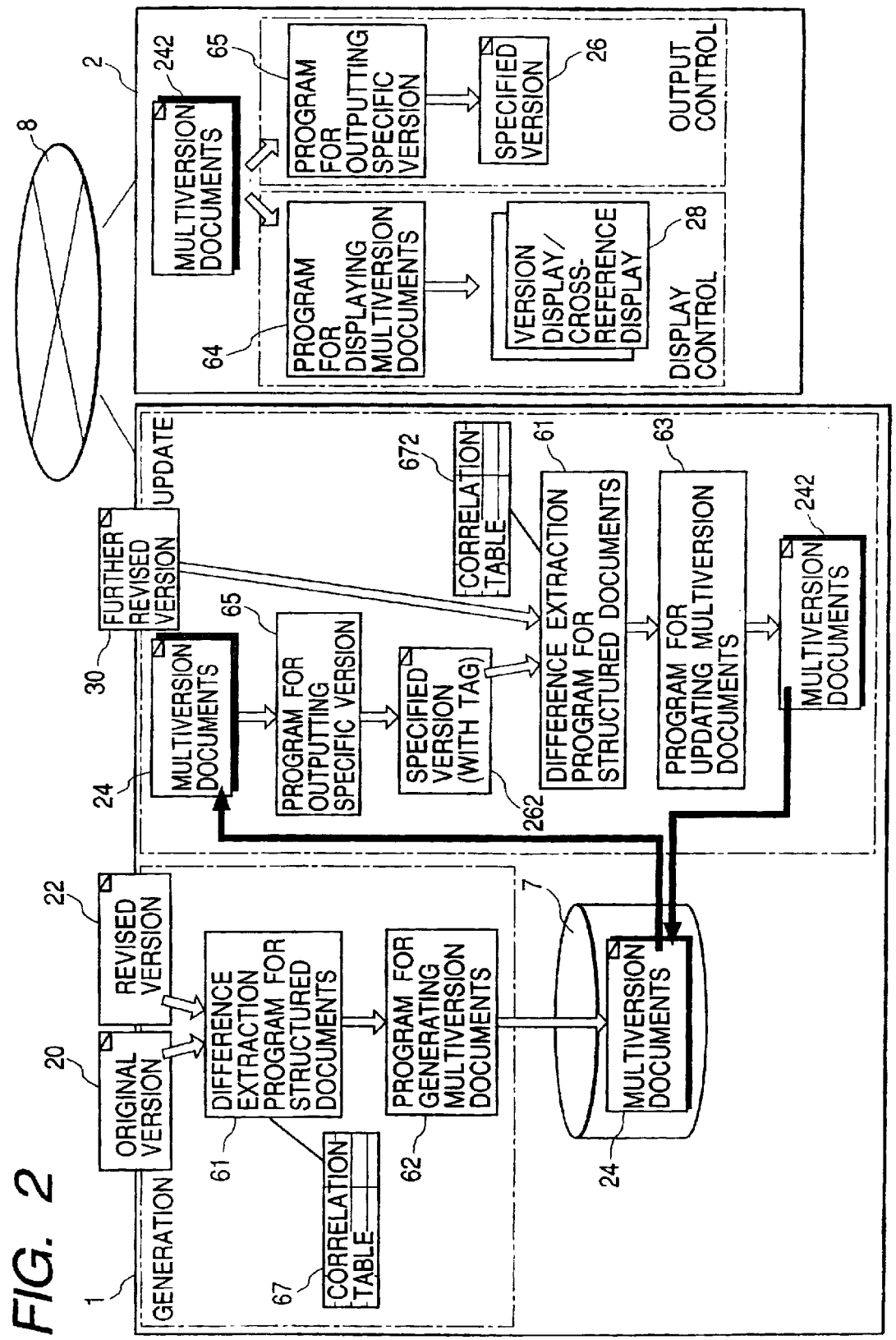

FIG. 3

<function-list>

...

<function-info>

<name>exec_diff</name>

<func>executes difference comparison</func>

<synopsis>int exec_diff( char * fname1, char * fname2)</synopsis>

<description>

<para>It executes the difference comparison processing, then outputs the result.</para>

</description>

<parameter-list>

<param><name>fname1</name><meaning>name of the file, which will be compared</meaning></param>

<param><name>fname2</name><meaning>name of the file, which will be compared</meaning></param>

</parameter-list>

<return-values>

<r-val><val>0</val><detail>succeeded</detail></r-val>

</return-values>

<notice>There are no special notices.</notice>

</function-info>

...

</function-list>

FIG. 4

```
<function-list>
...
  <function-info>
    <name>exec_diff</name>
    <func>executes difference comparison</func>
    <synopsis>int exec_diff ( char* str1, char* str2)</synopsis>
    <description>
      <para>It executes the difference comparison processing.</para>
      <para>Then, it outputs the result to the user-specified file.</para>
    </description>
    <parameter-list>
      <param><name>str1</name><meaning>a character string, which will be compared</meaning></param>
      <param><name>str2</name><meaning>a character string, which will be compared</meaning></param>
    </parameter-list>
    <return-values>
      <r-val><val>0</val><detail>succeeded</detail></r-val>
      <r-val><val>ERR_1</val><detail>illegal parameter</detail></r-val>
    </return-values>
  </function-info>
...
</function-list>
```

FIG. 5

```
<function-list>
...
<function-info>
  <name>exec_diff</name>
  <func>executes difference comparison, according to the specified comparison
  mode</func>
  <synopsis>int exec_diff( char* str1, char* str2)</synopsis>
  <description>
    <para>It executes the difference comparison processing, according to the
    specified comparison mode.</para>
    <para>THere are two comparison modes, "standard" and "detailed".</para>
    <para>Then, it outputs the result to the user-specified file.</para>
  </description>
  <parameter-list>
    <param><name>str1</name><meaning>a character string, which will be
    compared</meaning></param>
    <param><name>str2</name><meaning>a character string, which will be
    compared</meaning></param>
    <param><name>flg</name><meaning>comparison mode
    specification</meaning></param>
  </parameter-list>
  <return-values>
    <r-val><val>0</val><detail>succeeded</detail></r-val>
    <r-val><val>ERR_1</val><detail>the character string, which will be compared,
    is illegal</detail></r-val>
    <r-val><val>ERR_2</val><detail>initialization required</detail></r-val>
  </return-values>
  <notice>init_diff() must be executed before this function.</notice>
</function-info>
...
</function-list>
```

FIG. 7

| Word No. | 1 | 2 | 3 | 4 | 5 | 6 |
|---|---|---|---|---|---|---|
| V1 | ● | ● | exec_diff | ● | ● | executes |
| V2 | ● | ● | exec_diff | ● | ● | executes |

| 18 | 19 | 20 | 21 | 22 | 23 | 24 | 25 | 26 | 27 |
|---|---|---|---|---|---|---|---|---|---|
| char | * | | fname1 | , | | char | * | | fname2 |
| char | * | | str1 | , | | char | * | | str2 |

FIG. 9

| NODE ID | DIVIDED NODE ID | WORD No. | COMMON/ DIFFERENCE | DIFFERENCE TYPE | CHARACTER STRING | CORRESPONDING DIVIDED NODE ID | CORRESPONDING NODE ID |
|---|---|---|---|---|---|---|---|
| 11 | 111 | 3 | COMMON | — | exec_diff | 111 | 11 |
| 12 | 121 | 6~10 | COMMON | — | executes difference comparison | 121 | 12 |
| 13 | 131 | 13~20 | COMMON | — | int exec_diff( char* | 131 | 13 |
| 13 | 132 | 21 | DIFFERENCE | MODIFICATION | fname1 | 132 | 13 |
| 13 | 133 | 22~26 | COMMON | — | , char* | 133 | 13 |
| 13 | 134 | 27 | DIFFERENCE | MODIFICATION | fname2 | 134 | 13 |
| 13 | 135 | 28 | COMMON | — | ) | 135 | 13 |
| 141 | 1411 | 32~41 | COMMON | — | It executes the difference comparison | 1411 | 141 |
| 141 | 1412 | 42~45 | DIFFERENCE | DELETION | , then | — | — |
| 141 | 1413 | 46~50 | COMMON | — | outputs the result | 1421 | 142 |
| 141 | 1414 | 51 | DIFFERENCE | DELETION | . | 1423 | 142 |
| ... | | | | | | | |

| NODE ID | DIVIDED NODE ID | WORD No. | COMMON/ DIFFERENCE | DIFFERENCE TYPE | CHARACTER STRING | CORRESPONDING DIVIDED NODE ID | CORRESPONDING NODE ID |
|---|---|---|---|---|---|---|---|
| 1_1 | 1_1_1 | 3~11 | COMMON | — | exec_diff | 1_1_1 | 1_1 |
| 1_2 | 1_2_1 | 14~22 | COMMON | — | executes difference comparison | 1_2_1 | 1_2 |
| 1_3 | 1_3_1 | 25~45 | COMMON | — | int exec_diff( char* | 1_3_1 | 1_3 |
| 1_3 | 1_3_2 | 46~49 | DIFFERENCE | MODIFICATION | str1 | 1_3_2 | 1_3 |
| 1_3 | 1_3_3 | 50~57 | COMMON | — | , char* | 1_3_3 | 1_3 |
| 1_3 | 1_3_4 | 58~61 | DIFFERENCE | MODIFICATION | str2 | 1_3_4 | 1_3 |
| 1_3 | 1_3_5 | 62~63 | COMMON | — | ) | 1_3_5 | 1_3 |
| 1_4_1 | 1_4_1_1 | 67~76 | COMMON | — | It executes the difference comparison | 1_4_1_1 | 1_4_1 |
| 1_4_1 | 1_4_1_2 | 77~79 | DIFFERENCE | INSERTION | . | — | — |
| 1_4_2 | 1_4_2_1 | 82~86 | COMMON | — | the result | — | 1_4_1 |
| 1_4_2 | 1_4_2_2 | 87~97 | DIFFERENCE | INSERTION | to the user-specified file | — | — |
| 1_4_2 | 1_4_2_3 | 98~103 | COMMON | — | output | 1_4_1_4 | 1_4_1 |
| ... | | | | | | | |

67-2

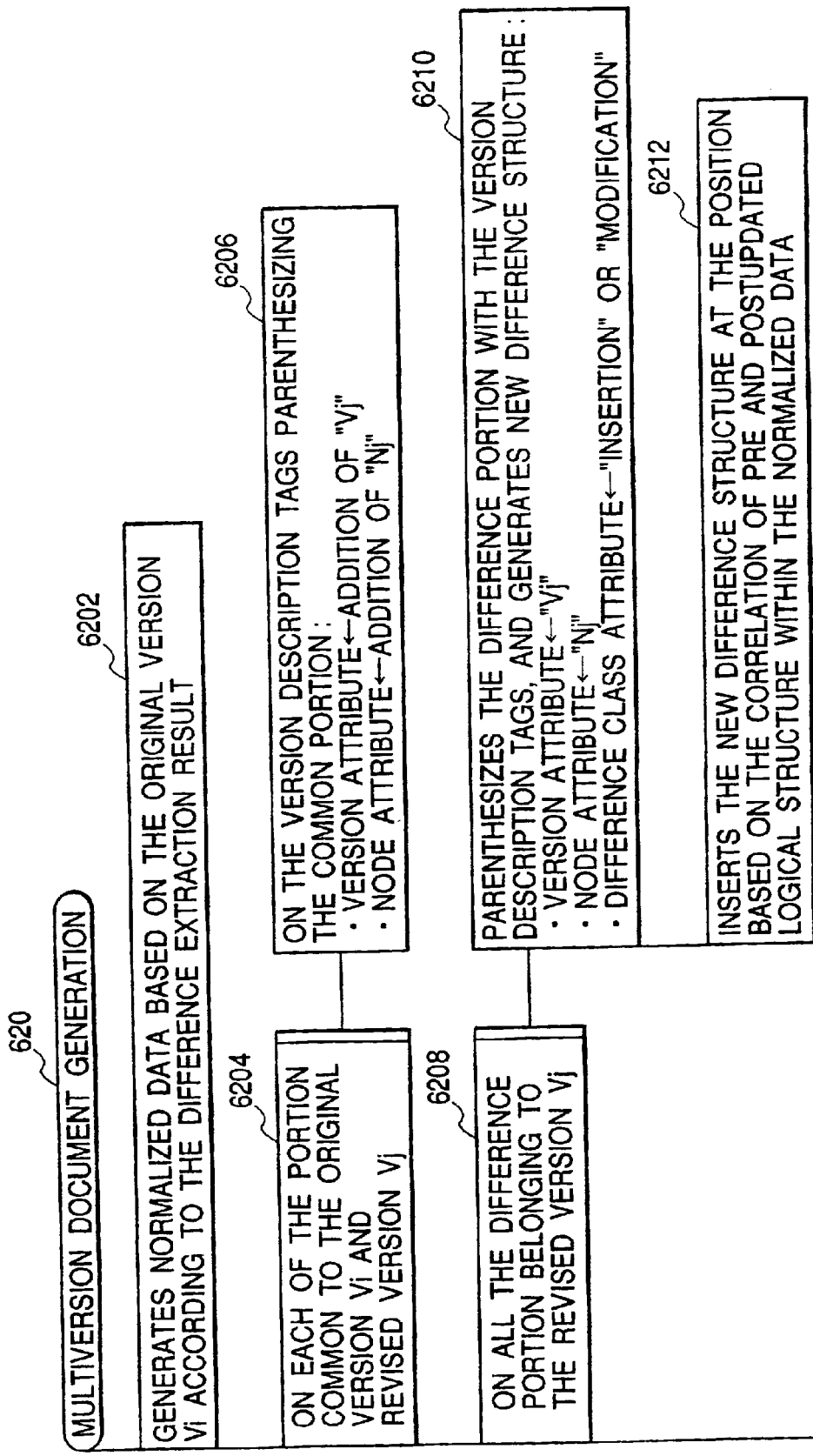

FIG. 13

```
<function-list xmlns:diff='http://www.xxx.yyy/diff/'>
...
 <diff:ver vnum="1" node ID="1"><function-info>
  <diff:ver vnum="1" node ID="1_1"><name>
   <diff:ver vnum="1" node ID="1_1_1">exec_diff</diff:ver></name></diff:ver>
  <diff:ver vnum="1" node ID="1_2"><func>
   <diff:ver vnum="1" node ID="1_2_1">execute difference comparison</diff:ver></func></diff:ver>
  <diff:ver vnum="1" node ID="1_3"><synopsis>
   <diff:ver vnum="1" node ID="1_3_1">int exec_diff( char* </diff:ver>
   <diff:ver vnum="1" node ID="1_3_2">fname1</diff:ver>
   <diff:ver vnum="1" node ID="1_3_3">, char* </diff:ver>
   <diff:ver vnum="1" node ID="1_3_4">fname2</diff:ver>
   <diff:ver vnum="1" node ID="1_3_5"> )</diff:ver></synopsis></diff:ver>
  <diff:ver vnum="1" node ID="1_4"><description>
   <diff:ver vnum="1" node ID="1_4_1"><para>
    <diff:ver vnum="1" node ID="1_4_1_1">It executes the difference comparison
                                                                    processing</diff:ver>
    <diff:ver vnum="1" node ID="1_4_1_2">. then</diff:ver>
    <diff:ver vnum="1" node ID="1_4_1_3">outputs the result.</diff:ver></para></diff:ver>
  </description></diff:ver>
  <diff:ver vnum="1" node ID="1_5"><parameter-list>
   <diff:ver vnum="1" node ID="1_5_1"><param>
    <diff:ver vnum="1" node ID="1_5_1_1"><name>
     <diff:ver vnum="1" node ID="1_5_1_1_1">fname1</diff:ver></name></diff:ver>
    <diff:ver vnum="1" node ID="1_5_1_2"><meaning>
     <diff:ver vnum="1" node ID="1_5_1_2_1">name of the file</diff:ver>
     <diff:ver vnum="1" node ID="1_5_1_2_2">, which will be
                                                       compared</diff:ver></meaning></diff:ver>
   </param></diff:ver>
   <diff:ver vnum="1" node ID="1_5_2"><param>
    <diff:ver vnum="1" node ID="1_5_2_1"><name>
     <diff:ver vnum="1" node ID="1_5_2_1_1">fname2</diff:ver></name></diff:ver>
    <diff:ver vnum="1" node ID="1_5_2_2"><meaning>
     <diff:ver vnum="1" node ID="1_5_2_2_1">name of the file</diff:ver>
     <diff:ver vnum="1" node ID="1_5_2_2_2">, which will be
                                                       compared</diff:ver></meaning></diff:ver>
   </param></diff:ver>
  </parameter-list></diff:ver>
  <diff:ver vnum="1" node ID="1_6"><return-values>
   <diff:ver vnum="1" node ID="1_6_1"><r-val>
    <diff:ver vnum="1" node ID="1_6_1_1"><val>
     <diff:ver vnum="1" node ID="1_6_1_1_1">0</diff:ver></val></diff:ver>
    <diff:ver vnum="1" node ID="1_6_1_2"><detail>
     <diff:ver vnum="1" node ID="1_6_1_2_1">succeeded</diff:ver></detail></diff:ver>
   </r-val></diff:ver>
  </return-values></diff:ver>
  <diff:ver vnum="1" node ID="1_7"><notice>
   <diff:ver vnum="1" node ID="1_7_1">There are no special notices.</diff:ver></notice></diff:ver>
 </function-info></diff:ver>
...
</function-list>
```

FIG. 14

```
<function-list xmlns:diff='http://www.xxx.yyy/diff/'>
...
<diff:ver vnum="1 2" node ID="1_1">function-info>
  <diff:ver vnum="1 2" node ID="1_1 1_1">name>
    <diff:ver vnum="1 2" node ID="1_1_1 1_1_1">exec_diff</diff:ver></name></diff:ver>
  <diff:ver vnum="1 2" node ID="1_2 1_2">func>
    <diff:ver vnum="1 2" node ID="1_2_1 1_2_1">execute difference comparison</diff:ver></func></diff:ver>
  <diff:ver vnum="1 2" node ID="1_3 1_3">synopsis>
    <diff:ver vnum="1 2" node ID="1_3_1 1_3_1">int exec_diff( char* </diff:ver>
    <diff:ver vnum="1" node ID="1_3_2">name1</diff:ver>
    <diff:ver vnum="2" node ID="1_3_2" desc="modification">str1</diff:ver>
    <diff:ver vnum="1 2" node ID="1_3_3 1_3_3">, char* </diff:ver>
    <diff:ver vnum="1" node ID="1_3_4">name2</diff:ver>
    <diff:ver vnum="2" node ID="1_3_4" desc="modification">str2</diff:ver>
    <diff:ver vnum="1 2" node ID="1_3_5 1_3_5">)</diff:ver></synopsis></diff:ver>
  <diff:ver vnum="1 2" node ID="1_4 1_4">description>
    <diff:ver vnum="1 2" node ID="1_4_1 1_4_1">para>
      <diff:ver vnum="1 2" node ID="1_4_1_1 1_4_1_1">It executes the difference comparison processing</diff:ver>
      <diff:ver vnum="1" node ID="1_4_1_2">. </diff:ver>
      <diff:ver vnum="2" node ID="1_4_1_2" desc="insertion">. </diff:ver></para></diff:ver>
    <diff:ver vnum="1 2" node ID="1_4_1 1_4_2">para>
      <diff:ver vnum="1 2" node ID="1_4_1_3 1_4_2_1">the result</diff:ver>
      <diff:ver vnum="2" node ID="1_4_2_2" desc="insertion">to the user-specified file</diff:ver>
      <diff:ver vnum="1 2" node ID="1_4_1_4 1_4_2_3">output</diff:ver></para></diff:ver>
</description></diff:ver>
  <diff:ver vnum="1 2" node ID="1_5 1_5">parameter-list>
    <diff:ver vnum="1 2" node ID="1_5_1 1_5_1">param>
      <diff:ver vnum="1 2" node ID="1_5_1_1 1_5_1_1">name>
        <diff:ver vnum="1" node ID="1_5_1_1_1">name1</diff:ver>
        <diff:ver vnum="2" node ID="1_5_1_1_1" desc="modification">str1</diff:ver></name></diff:ver>
      <diff:ver vnum="1 2" node ID="1_5_1_2 1_5_1_2">meaning>
        <diff:ver vnum="1 2" node ID="1_5_1_2_1 1_5_1_2_1">which will be compared</diff:ver>
        <diff:ver vnum="1" node ID="1_5_1_2_2">name of the file</diff:ver>
        <diff:ver vnum="2" node ID="1_5_1_2_2" desc="insertion">characer string</diff:ver></meaning></diff:ver>
</param></diff:ver>
    <diff:ver vnum="1 2" node ID="1_5_2 1_5_2">param>
      <diff:ver vnum="1 2" node ID="1_5_2_1 1_5_2_1">name>
        <diff:ver vnum="1" node ID="1_5_2_1_1">name2</diff:ver>
        <diff:ver vnum="2" node ID="1_5_2_1_1" desc="modification">str2</diff:ver></name></diff:ver>
      <diff:ver vnum="1 2" node ID="1_5_2_2 1_5_2_2">meaning>
        <diff:ver vnum="1 2" node ID="1_5_2_2_1 1_5_2_2_1">which will be compared</diff:ver>
        <diff:ver vnum="1" node ID="1_5_2_2_2">name of the file</diff:ver>
        <diff:ver vnum="2" node ID="1_5_2_2_2" desc="insertion">characer string</diff:ver></meaning></diff:ver>
</param></diff:ver>
</parameter-list></diff:ver>
  <diff:ver vnum="1 2" node ID="1_6 1_6">return-values>
    <diff:ver vnum="1 2" node ID="1_6_1 1_6_1">r-val>
      <diff:ver vnum="1 2" node ID="1_6_1_1 1_6_1_1">val>
        <diff:ver vnum="1 2" node ID="1_6_1_1_1 1_6_1_1_1">0</diff:ver></val></diff:ver>
      <diff:ver vnum="1 2" node ID="1_6_1_2 1_6_1_2">detail>
        <diff:ver vnum="1 2" node ID="1_6_1_2_1 1_6_1_2_1">succeeded</diff:ver></detail></diff:ver>
      ...
```

FIG. 15

```
<function-list xmlns:diff='http://www.xxx.yyy/diff/'>
 <diff:ver vnum="1 2" node ID="1_1">function-info>
  <diff:ver vnum="1 2" node ID="1_1 1_1">name>
   <diff:ver vnum="1 2" node ID="1_1_1 1_1_1">exec_diff</diff:ver></name></diff:ver>
  <diff:ver vnum="1 2" node ID="1_2 1_2">func>
   <diff:ver vnum="1 2" node ID="1_2_1 1_2_1">execute difference comparison</diff:ver></func></diff:ver>
  <diff:ver vnum="1 2" node ID="1_3 1_3">synopsis>
   <diff:ver vnum="1 2" node ID="1_3_1 1_3_1">int exec_diff( char *  </diff:ver>
   <diff:ver vnum="2"   node ID="1_3_2" desc="modification">str1</diff:ver>
   <diff:ver vnum="1 2" node ID="1_3_3 1_3_3">, char *  </diff:ver>
   <diff:ver vnum="2"   node ID="1_3_4" desc="modification">str2</diff:ver>
   <diff:ver vnum="1 2" node ID="1_3_5 1_3_5">)</diff:ver></synopsis></diff:ver>
  <diff:ver vnum="1 2" node ID="1_4 1_4">description>
   <diff:ver vnum="1 2" node ID="1_4_1 1_4_1">para>
    <diff:ver vnum="1 2" node ID="1_4_1_1 1_4_1_1">It executes the difference comparison processing</diff:ver>
    <diff:ver vnum="2"   node ID="1_4_1_2" desc="insertion">. </diff:ver></para></diff:ver>
   <diff:ver vnum="1 2" node ID="1_4_1 1_4_2">para>
    <diff:ver vnum="1 2" node ID="1_4_1_3 1_4_2_1">the result</diff:ver>
    <diff:ver vnum="2"   node ID="1_4_2_2" desc="insertion">to the user-specified file</diff:ver>
    <diff:ver vnum="1 2" node ID="1_4_1_4 1_4_2_3">output</diff:ver></para></diff:ver>
  </description></diff:ver>
  <diff:ver vnum="1 2" node ID="1_5 1_5">parameter-list>
   <diff:ver vnum="1 2" node ID="1_5_1 1_5_1">param>
    <diff:ver vnum="1 2" node ID="1_5_1_1 1_5_1_1">name>
     <diff:ver vnum="2"   node ID="1_5_1_1_1" desc="modification">str1</diff:ver></name></diff:ver>
    <diff:ver vnum="1 2" node ID="1_5_1_2 1_5_1_2">meaning>
     <diff:ver vnum="1 2" node ID="1_5_1_2_1 1_5_1_2_1">which will be compared</diff:ver>
     <diff:ver vnum="2"   node ID="1_5_1_2_2" desc="insertion">characer string</diff:ver></meaning></diff:ver>
   </param></diff:ver>
   <diff:ver vnum="1 2" node ID="1_5_2 1_5_2">param>
    <diff:ver vnum="1 2" node ID="1_5_2_1 1_5_2_1">name>
     <diff:ver vnum="2"   node ID="1_5_2_1_1" desc="modification">str2</diff:ver></name></diff:ver>
    <diff:ver vnum="1 2" node ID="1_5_2_2 1_5_2_2">meaning>
     <diff:ver vnum="1 2" node ID="1_5_2_2_1 1_5_2_2_1">which will be compared</diff:ver>
     <diff:ver vnum="2"   node ID="1_5_2_2_2" desc="insertion">characer string</diff:ver></meaning></diff:ver>
   </param></diff:ver>
  </parameter-list></diff:ver>
  <diff:ver vnum="1 2" node ID="1_6 1_6">return-values>
   <diff:ver vnum="1 2" node ID="1_6_1 1_6_1">r-val>
    <diff:ver vnum="1 2" node ID="1_6_1_1 1_6_1_1">val>
     <diff:ver vnum="1 2" node ID="1_6_1_1_1 1_6_1_1_1">0</diff:ver></val></diff:ver>
    <diff:ver vnum="1 2" node ID="1_6_1_2 1_6_1_2">detail>
     <diff:ver vnum="1 2" node ID="1_6_1_2_1 1_6_1_2_1">succeeded</diff:ver></detail>
   </diff:ver>
   </r-val></diff:ver>
   <diff:ver vnum="2" node ID="1_6_2" desc="insertion">r-val>
    <diff:ver vnum="2" node ID="1_6_2_1" desc="insertion">val>
     <diff:ver vnum="2" node ID="1_6_2_1_1" desc="insertion">ERR_1</diff:ver>val></diff:ver>
    <diff:ver vnum="2" node ID="1_6_2_2" desc="insertion">detail>
     <diff:ver vnum="2" node ID="1_6_2_2_1" desc="insertion">invalid param</diff:ver></detail:ver>
   </r-val></diff:ver>
...
```

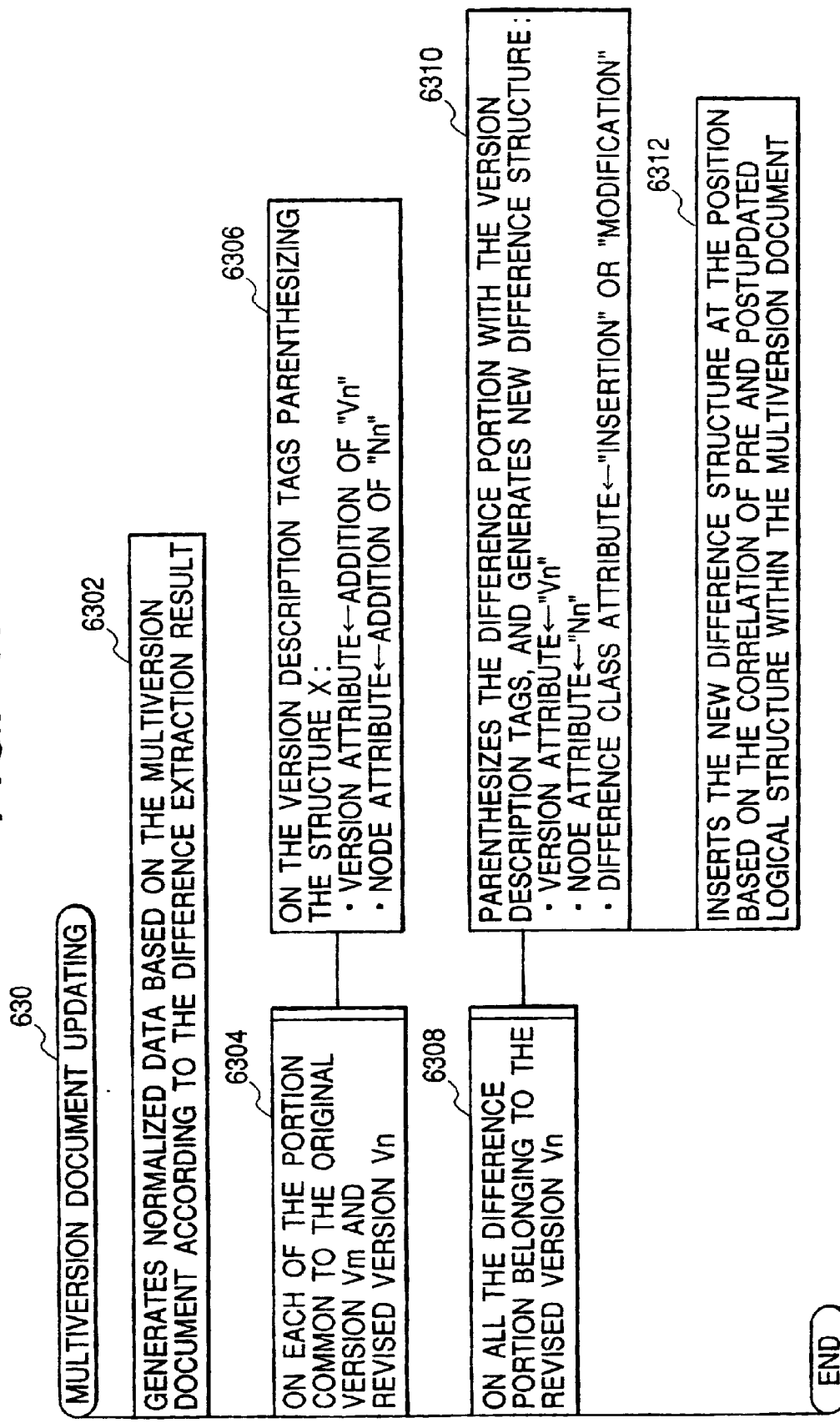

FIG. 18

```
<function-list xmlns:diff='http://www.xxx.yyy/diff/'>
...
<diff:ver vnum="1 2 3" node ID="1_1 1_1 1_1"><function-info>
 <diff:ver vnum="1 2 3" node ID="1_1 1_1 1_1"><name>
  <diff:ver vnum="1 2 3" node ID="1_1_1 1_1_1 1_1_1">exec_diff</diff:ver></name></diff:ver>
 <diff:ver vnum="1 2 3" node ID="1_2 1_2 1_2"><func>
  <diff:ver vnum="3" node ID="1_2_1">It executes the difference comparison processing,</diff:ver>
  <diff:ver vnum="1 2 3" node ID="1_2_1 1_2_1 1_2_2">according to the specified difference comparison mode</diff:ver>
 </func></diff:ver>
 <diff:ver vnum="1 2 3" node ID="1_3 1_3 1_3"><synopsis>
  <diff:ver vnum="1 2 3" node ID="1_3_1 1_3_1 1_3_1">int exec_diff( char * </diff:ver>
  <diff:ver vnum="1" node ID="1_3_2">name1</diff:ver>
  <diff:ver vnum="2 3" node ID="1_3_2 1_3_2">str1</diff:ver>
  <diff:ver vnum="1 2 3" node ID="1_3_3 1_3_3 1_3_3">, char * </diff:ver>
  <diff:ver vnum="1" node ID="1_3_4">name2</diff:ver>
  <diff:ver vnum="2 3" node ID="1_3_4 1_3_4">str2</diff:ver>
  <diff:ver vnum="3" node ID="1_3_5">, int flg</diff:ver>
  <diff:ver vnum="1 2 3" node ID="1_3_5 1_3_5 1_3_6">)</diff:ver></synopsis></diff:ver>
 <diff:ver vnum="1 2 3" node ID="1_4 1_4 1_4"><description>
  <diff:ver vnum="1 2 3" node ID="1_4_1 1_4_1 1_4_1"><para>
   <diff:ver vnum="3" node ID="1_4_1_1">It executes the difference comparison processing,</diff:ver>
   <diff:ver vnum="1 2 3" node ID="1_4_1_1 1_4_1_1 1_4_1_2">according to the specified difference comparison processing mode</diff:ver>
   <diff:ver vnum="1" node ID="1_4_1_2">. </diff:ver>
   <diff:ver vnum="2 3" node ID="1_4_1_2 1_4_1_3">. </diff:ver></para></diff:ver>
  <diff:ver vnum="3" node ID="1_4_2"><para>
   <diff:ver vnum="3" node ID="1_4_2_1">The difference comparison processing modes have a general mode and a detail mode.
   </diff:ver></para></diff:ver>
  <diff:ver vnum="1 2 3" node ID="1_4_1 1_4_2 1_4_3"><para>
   <diff:ver vnum="1 2 3" node ID="1_4_1_3 1_4_2_1 1_4_3_1">the result</diff:ver>
   <diff:ver vnum="2 3" node ID="1_4_2_2 1_4_3_2">to the user-specified file</diff:ver>
   <diff:ver vnum="1 2 3" node ID="1_4_1_4 1_4_2_3 1_4_3_3">output</diff:ver>
  </para></diff:ver>
 </description></diff:ver>
 <diff:ver vnum="1 2 3" node ID="1_5 1_5 1_5"><parameter-list>
  <diff:ver vnum="1 2 3" node ID="1_5_1 1_5_1 1_5_1"><param>
   <diff:ver vnum="1 2 3" node ID="1_5_1_1 1_5_1_1 1_5_1_1"><name>
    <diff:ver vnum="1" node ID="1_5_1_1_1">name1</diff:ver>
    <diff:ver vnum="2 3" node ID="1_5_1_1_1 1_5_1_1_1">str1</diff:ver></name></diff:ver>
   <diff:ver vnum="1 2 3" node ID="1_5_1_2 1_5_1_2 1_5_1_2"><meaning>
    <diff:ver vnum="1 2 3" node ID="1_5_1_2_1 1_5_1_2_1 1_5_1_2_1">which will be compared</diff:ver>
    <diff:ver vnum="1" node ID="1_5_1_2_2">name of the file</diff:ver>
    <diff:ver vnum="2 3" node ID="1_5_1_2_2 1_5_1_2_2">characer string</diff:ver></meaning></diff:ver>
  </param></diff:ver>
  <diff:ver vnum="1 2 3" node ID="1_5_2 1_5_2 1_5_2"><param>
   <diff:ver vnum="1 2 3" node ID="1_5_2_1 1_5_2_1 1_5_2_1"><name>
    <diff:ver vnum="1" node ID="1_5_2_1_1">name2</diff:ver>
    <diff:ver vnum="2 3" node ID="1_5_2_1_1 1_5_2_1_1">str2</diff:ver></name></diff:ver>
   <diff:ver vnum="1 2 3" node ID="1_5_2_2 1_5_2_2 1_5_2_2"><meaning>
    <diff:ver vnum="1 2 3" node ID="1_5_2_2_1 1_5_2_2_1 1_5_2_2_1">which will be compared</diff:ver>
    <diff:ver vnum="1" node ID="1_5_2_2_2">name of the file</diff:ver>
    <diff:ver vnum="2 3" node ID="1_5_2_2_2 1_5_2_2_2">character string</diff:ver></meaning></diff:ver>
...
```

FIG. 26

```
<doc>
...
<c1>10. 文書内容処理のサブモデル群</c1>
<p>SPDL文書の内容は、そのSPDL文書内にあるトークン列の内容からなる。
本来宣言的な性質を持つ構造表記法とは異なり、これらのトークン列は、内容プロセサによって解釈される手続き型言語の形で文書内容を表現する。
文書内容及びそれに関連する解釈文脈は、文書構造処理の過程において節9に示すとおりに識別される。
次に、それらのデータが内容プロセサに供給される。</p>
<p>文書内容の処理は、SPDL文書によって記述されたページ画像の集合を作画することからなる。
この複雑な活動をより正確に定義するため、いくつかのサブモデルを用いる。
</p>
<p>本節では、内容の解釈過程全体をモデル化した仮想機械、並びに作画モデル及び座標系とを定義する。
節15では色モデルを定義する。
節16、17及び18では、文字テキストとフォント、ラスタ図形及び幾何図形のためのサブモデルを定義する。
節19ではクリップ領域のふるまいを定義する。
節20ではパターン付きの論理インクのためのサブモデルを定義する。
そして節22、23及び24では、ラスタ図形データの伸長と変換、フォーム及びエラー処理のためのサブモデルを定義する。</p>
...
</doc>
```

FIG. 27

| NODE ID | DIVIDED NODE ID | WORD No. | COMMON/ DIFFERENCE | DIFFERENCE TYPE | CHARACTER STRING | CORRESPONDING DIVIDED NODE ID | CORRESPONDING NODE ID |
|---|---|---|---|---|---|---|---|
| 1_11 | 1_11_1 | 2~24 | DIFFERENCE | MODIFICATION | 10 Document Content... | 1_11_1 | 1_11 |
| 1_12 | 1_12_1 | 45~143 | DIFFERENCE | MODIFICATION | The content of an... | 1_12_1 | 1_12 |
| 1_12 | 1_12_2 | 144~344 | DIFFERENCE | MODIFICATION | Unlike the structu... | 1_12_2 | 1_12 |
| 1_12 | 1_12_3 | 345~485 | DIFFERENCE | MODIFICATION | The document content... | 1_12_3 | 1_12 |
| 1_12 | 1_12_4 | 486~548 | DIFFERENCE | MODIFICATION | These data are then... | 1_12_4 | 1_12 |
| 1_13 | 1_13_1 | 551~651 | DIFFERENCE | MODIFICATION | Document content pr... | 1_13_1 | 1_13 |
| 1_13 | 1_13_2 | 652~723 | DIFFERENCE | MODIFICATION | Defining this compl... | 1_13_2 | 1_13 |
| 1_14 | 1_14_1 | 726~866 | DIFFERENCE | MODIFICATION | This clause defines... | 1_14_1 | 1_14 |
| 1_14 | 1_14_2 | 867~898 | DIFFERENCE | DELETION | Clause 15 defines... | 1_14_2 | 1_14 |
| 1_14 | 1_14_3 | 899~1008 | DIFFERENCE | MODIFICATION | Clause 16, 17, and 18... | 1_14_3 | 1_14 |
| 1_14 | 1_14_4 | 1009~1059 | DIFFERENCE | MODIFICATION | Clause 19 defines... | 1_14_4 | 1_14 |
| ... | | | | | | | |

FIG. 28

| NODE ID | DIVIDED NODE ID | WORD No. | COMMON/ DIFFERENCE | DIFFERENCE TYPE | CHARACTER STRING | CORRESPONDING DIVIDED NODE ID | CORRESPONDING NODE ID |
|---|---|---|---|---|---|---|---|
| 1_11 | 1_11_1 | 2~18 | DIFFERENCE | MODIFICATION | 10.文書内容処理のサ… | 1_11_1 | 1_11 |
| 1_12 | 1_12_1 | 21~56 | DIFFERENCE | MODIFICATION | SPDL文書の内容は、… | 1_12_1 | 1_12 |
| 1_12 | 1_12_2 | 57~123 | DIFFERENCE | MODIFICATION | 本来宣言的な性質を… | 1_12_2 | 1_12 |
| 1_12 | 1_12_3 | 124~170 | DIFFERENCE | MODIFICATION | 文書内容及びそれに… | 1_12_3 | 1_12 |
| 1_12 | 1_12_4 | 171~194 | DIFFERENCE | MODIFICATION | 次に、それらのデー… | 1_12_4 | 1_12 |
| 1_13 | 1_13_1 | 197~240 | DIFFERENCE | MODIFICATION | 文書内容は活動を… | 1_13_1 | 1_13 |
| 1_13 | 1_13_2 | 241~275 | DIFFERENCE | MODIFICATION | この節の複雑な活動をよ… | 1_13_2 | 1_13 |
| 1_14 | 1_14_1 | 278~323 | DIFFERENCE | MODIFICATION | 本節では、内容モデルを… | 1_14_1 | 1_14 |
| 1_14 | 1_14_2 | 324~338 | DIFFERENCE | MODIFICATION | 節15では色モデルを… | 1_14_2 | 1_14 |
| 1_14 | 1_14_3 | 339~389 | DIFFERENCE | MODIFICATION | 節16、17及び18では… | 1_14_3 | 1_14 |
| 1_14 | 1_14_4 | 390~411 | DIFFERENCE | MODIFICATION | 節19ではクリップ領… | 1_14_4 | 1_14 |
| … | | | | | | | |

FIG. 29

```
<doc xmlns:diff='http://www.xxx.yyy/diff/'>
...
<diff:ver vkind="e j"Xc1>
  <diff:ver vkind="e">10 Document Content Processing Sub-Models</diff:ver>
  <diff:ver vkind="j">10、文書内容処理のサブモデル群</diff:ver>
</c1></diff:ver>
<diff:ver vkind="e j"Xp>
  <diff:ver vkind="e">The content of an SPDL document consists of
    the contents of the TOKENSEQUENCES in the SPDL document.</diff:ver>
  <diff:ver vkind="j">
    SPDL文書の内容は、そのSPDL文書内にあるトークン列の内容からなる。</diff:ver>
  <diff:ver vkind="e">
    Unlike the structure notation, which is declarative in nature, these
    TOKENSEQUENCES express the document contents in the form of a procedural
    language to be interpreted by the document content processor.</diff:ver>
  <diff:ver vnum="j">
    本来宣言的な性質を持つ構造表記法とは異なり、これらのトークン列は、内容プロセ
    サによって解釈される手続き型言語の形で文書内容を表現する。</diff:ver>
  <diff:ver vkind="e">The document contents, and associated contexts of
    interpretation, are identified during document structure processing as
    described in clause 9.</diff:ver>
  <diff:ver vkind="j">文書内容及びそれに関連する解釈文脈は、文書構造
    造処理の過程において節9に示すとおりに識別される。</diff:ver>
  <diff:ver vkind="e">
    These data are then provided to the document content processor.</diff:ver>
  <diff:ver vkind="j">
    次に、それらのデータが内容プロセサに供給される。</diff:ver>
</p></diff:ver>
<diff:ver vkind="e j"Xp>
  <diff:ver vkind="e">Document content processing consists of
    imaging the set of page images rendered by the SPDL document.</diff:ver>
  <diff:ver vkind="j">文書内容の処理は、SPDL文書によって記述された
    ページ画像の集合を作画することからなる。</diff:ver>
...
</doc>
```

METHOD AND SYSTEM FOR MANAGING DOCUMENTS

BACKGROUND OF THE INVENTION

The present invention relates to a method and a system for managing documents so as to indicate changes among a plurality of versions of a document by specifying and showing each difference between the versions.

Recently, documents to be widely distributed and reused, such as product manuals, have been written and stored in structured document formats, such as SGML (Standard Generalized Markup Language) in order to facilitate their distribution and reuse. As for frequently revised documents, a new version document (hereinafter simply referred to as a version) is generated each time a document is revised, and each new version is generally managed as a separate file. To intuitively grasp changes between versions, it is effective to employ a "difference indication" method in which matching relationships between corresponding character strings in two files of different versions are extracted, and then portions (strings) which do not have corresponding matched portions (strings) are indicated as differences.

Japanese Laid-Open Patent Publication No. 9-319632 (1997) discloses a method for managing versions of structured documents, describing a technique of extracting differences between structured documents and indicating the extracted differences. Specifically, this version management method sets one of two versions written in a structured document format as a reference version, extracts difference information between the two versions (that is, extracts each change, and the portion to which the change has been made), and outputs an SGML document (hereinafter referred to as a "difference-embedded document"), which is structurally described and embedded in the reference version. This difference-embedded document can be displayed by use of SGML document editing software available, etc. to highlight the changes from the reference version. Furthermore, each version can be restored by interpreting the structural description of the changes (difference information) embedded in the difference-embedded document, and converting the structure of the difference-embedded document based on the structural description. That is to say, a difference-embedded document is a document in which contents of two versions are efficiently described so that the contents of two versions are separable.

Further, in order to efficiently manage versions of a frequently revised documents, the method for managing versions according to the above patent publication sets a certain version as a reference version. And each time a new version is created, the method extracts difference information between the new version and the reference version. After that, the method outputs a "difference document" in which only the obtained difference information is structurally described, and stores the output difference document as version management data in order to reduce the amount of data required for version management. In this case, it is possible to restore the two versions by interpreting the structural description of the changes (difference information) in each difference document, and converting the structure of the reference version based on the structural description.

Like HTML (Hyper Text Markup Language), XML (extensible Markup Language) is a structured document description language intended to be used on the Internet. XML is structurally a subset of SGML and can define a document structure freely as is the case with SGML. Not only can XML document data be displayed and printed out by use of an XML-aware Web browser, but also it can express various data based on a document structure defined for a specific application, which makes XML useful as a data exchange format on the Internet. Recently, various industries have been employing their industry-standard data exchange formats defined by use of XML.

A document body having a logical structure can be described in XML without using a prepared DTD (document type definition), which is not possible with SGML. However, it is necessary to mark up each element constituting the logical structure, instead, by sandwiching the element between a start tag and an end tag. To express an element "participant name" which is composed of elements "surname" and "first name", for example, it is necessary to write a line such as: "<participant name><surname>Hitachi</surname><first name>Taro</first name></participant name>". In SGML, on the other hand, if a DTD clarifies that the element "participant name" is composed of the elements "surname" and "first name", the end tags "</surname>" and "</first name>" can be omitted by writing a line such as: "<participant name><surname>Hitachi<first name>Taro</participant name>".

In XML, it is possible to write a document having a logical structure without necessarily preparing a DTD by sandwiching each element in the document between a start tag and an end tag, as described above. Capitalizing on this advantage, it is possible to freely combine various tag sets used for writing industry-standard data to write a document. The XML namespace is used to avoid "collision" between element names (duplication of an element name), which may occur when a plurality of tag sets are used in a document. Consider a case in which a document including formulas and tables is written using three types of tag sets for writing the entire document body, the formulas, and the tables, respectively. Furthermore, suppose that the document body tag set includes a tag "<title>" for indicating a document title, and the table tag set also includes a tag "<title>" for indicating a table title. In such a case, the expression "<title>XXX survey results</title>" appearing in the document, for example, is vague as to which tag set the expression belongs to. To clarify which tag set each tag belongs to, a tag indicating a table title, for example, is expressed as "<table: title>". In this case, the word "table" indicates a namespace specifying a table tag set. Use of namespaces enables an application to discriminate each tag set even in an XML document including a plurality of tag sets. Furthermore, it is possible to regard only a tag set belonging to a specific namespace as a target for processing.

SUMMARY OF THE INVENTION

The following description exemplifies a case in which an application program is maintained up to date by referring to descriptions of APIs (Application Programming Interfaces) in versions of a programmer's guide written in a structured document format. It is assumed that a person in charge of the maintenance knows beforehand the version number of the programmer's guide corresponding to the APIs currently used in the program to be maintained (this version number is hereinafter referred to as "the earlier version number", or "the version number of the earlier version"), and obtains changes made to the APIs by later versions to modify the program based on the changes.

To maintain an application program as described above, all APIs changed after the earlier version are extracted, and in which version (that is, when) each API change was made is specified. After that, it is necessary to determine the history of the changes indicating how changes were made on each version and obtain the contents of the latest version.

However, the conventional method for indicating difference information displays difference information obtained as a result of comparing only two versions: a reference version and each target version. Accordingly, when an earlier version is regarded as a reference version, and compared with the latest version to indicate their difference, the comparison results obtained indicate only the accumulated total difference (changes) between the reference version and the latest version. That is, it is not possible to obtain the information of how changes were made on each version between the reference and the latest versions. It may be possible to compare each newly revised version with its immediately previous version and extract the difference between them with regarding the immediately previous one as a reference version. However, when there are one or more versions generated between the earlier and the latest versions, it is necessary to trace the API change history from the earlier version to the latest version by checking changes between each version and its immediately previous version in between, and the portions to which the changes were made, resulting in time-consuming work.

A conventional difference-embedded document efficiently expresses the contents of two versions in a single document by using difference information derived from comparing the reference version and the target version. However, it is not possible to express the contents of more than two versions in one conventional difference-embedded document.

In order to solve the above problems, it is an object of the present invention to provide a method capable of expressing changes made to each version of a multi-version document.

To achieve the above object, a method of the present invention for generating a "multi-version" document using a revised version and its immediately previous version of a structured document extracts: common portions each composed of a common structure and text character strings included in both the revised version and its immediately previous version of the structured document; difference portions each specific to either the revised version or its immediately previous version; and correlation between structures included in the revised version and structures included in its immediately previous version, and correlation between text character strings included in the revised version and those in its immediately previous version.

This method then creates the following multi-version document. In this multi-version document, each extracted common portion has a pair of version description tags attached thereto one of which includes the version identifiers of the revised version and its immediately previous version, and the node identifiers of this extracted common portion in the revised version and its immediately previous version. This multi-version document further includes each extracted difference portion having a pair of version description tags attached thereto one of which includes the version identifier of the version including this extracted difference portion, the node identifier of the extracted difference portion in the version including the extracted difference portion, and information indicating whether the extracted difference portion has been produced as a result of insertion or modification. This multi-version document further includes the correlation information described above. Thus, the above method of the present invention creates a multi-version document in which contents of two versions are efficiently expressed.

When a newly revised version has been created, the last version included in the multi-version document and the newly revised version are subjected to the above processing to produce a new multi-version document.

Based on this multi-version document, it is possible to display any arbitrary version. Furthermore, difference between a specific version and another version can be displayed also based on this multi-version document.

As described above, the present invention is capable of expressing changes made to a specific version selected from among a plurality of versions, using a single multi-version document.

BRIEF DESCRIPTION OF THE DRAWINGS

FIG. 2 is a schematic diagram showing processes employed by the present invention;

FIG. 3 is a diagram showing an example of structured document data (a programmer's guide V1) to be processed according to the present invention;

FIG. 4 is a diagram showing another example of structured document data (a programmer's guide V2) to be processed according to the present invention;

FIG. 5 is a diagram showing still another example of structured document data (a programmer's guide V3) to be processed according to the present invention;

FIG. 7 is a diagram showing an example of data used for difference extraction;

FIG. 9 is a diagram showing a correlation table for the programmer's guide V1;

FIG. 10 is a diagram showing a correlation table for the programmer's guide V2;

FIG. 11 is a problem analysis diagram (PAD diagram) of a program for generating multi-version documents;

FIG. 13 is a diagram showing normalized data of the programmer's guide V1;

FIG. 14 is a diagram showing a multi-version document expressing the contents of the programmer's guides V1 and V2;

FIG. 15 is a diagram showing a tag-attached version V2a;

FIG. 17 is a PAD diagram of a program for updating multi-version documents;

FIG. 18 is a diagram showing multi-version document data expressing the contents of the programmer's guides V1, V2, and V3;

FIG. 26 is a diagram showing another example of structured document data (Japanese version) to be processed according to the second embodiment of the present invention;

FIG. 27 is a diagram showing a correlation table for the English version;

FIG. 28 is a diagram showing a correlation table for the Japanese version; and

FIG. 29 is a diagram showing a multilingual document expressing the contents of the English version and the Japanese version.

DETAILED DESCRIPTION OF THE INVENTION

A first embodiment of the present invention will be described below with reference to the accompanying drawings.

Figure 1:
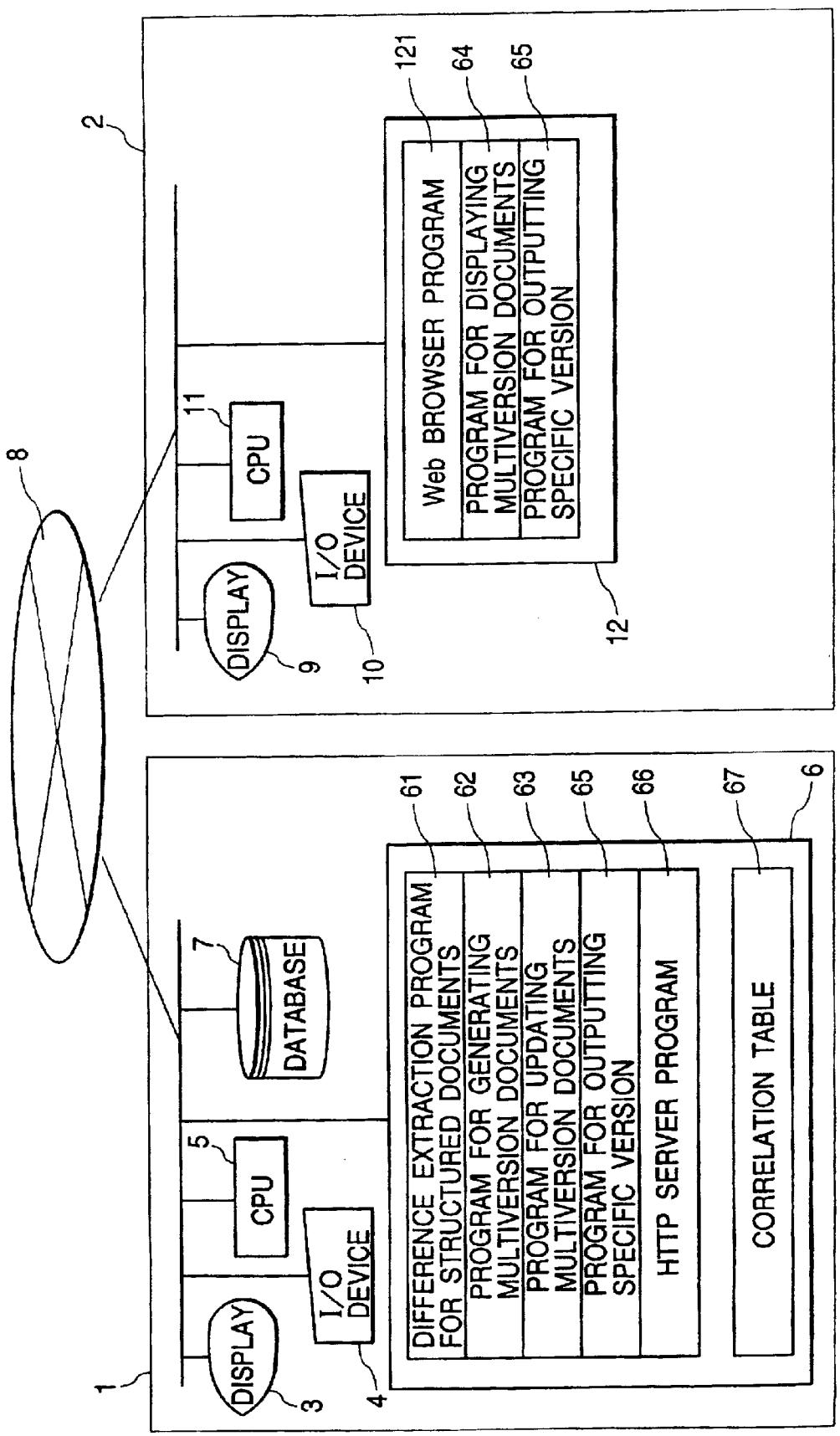
FIG. 1 is a diagram showing the configuration of a system according to the present invention.

FIG. 1 shows the system configuration of the first embodiment. In the figure, a computer 1 connected to a network 8 is a document management server having a difference extraction function for structured documents while a computer 2 is a client which obtains document data stored in the document management server through the network. Even though the present invention does not specify a communication means between the server and the client, the following description of the first embodiment assumes that the HTTP protocol on the Internet is used as the communication means between them. More specifically, it is assumed that the document management server 1 has an HTTP server function, and the client 2 communicates with the document management server 1 using a Web browser. Accordingly, the document management server 1 comprises a display 3, a data input device 4 such as a keyboard, a CPU 5, a memory 6, and a database 7 storing structured documents written in SGML, HTML, XML, etc. The memory 6 holds a difference extraction program 61 for structured documents, a program 62 for generating multi-version documents, a program 63 for updating multi-version documents, a program 65 for outputting a specific version, an HTTP server program 66, and a correlation table 67 generated by the difference extraction program 61 for structured documents. On the other hand, the client 2 comprises a display 9, an input device 10, a CPU 11, and a memory 12. The memory 12 holds a Web browser program 121, a program 64 for displaying multi-version documents, and the program 65 for outputting a specific version.

FIG. 2 schematically shows processes employed by this embodiment.

The process of creating a new multi-version document proceeds as follows. First, the difference extraction program 61 for structured documents is executed on two versions (for example, an original version 20 and a revised version 22) written in a structured document format. The difference extraction results are stored in the correlation table 67. Then, the program 62 for generating multi-version documents is executed to generate a multi-version document 24 of the XML format which expresses the contents of the two versions in a file, based on the difference extraction results stored in the correlation table 67.

The process of updating a multi-version document proceeds as follows. First, the program 65 for outputting a specific version is executed to output a latest version 262 as a specified version included in the multi-version document 24. Next, the difference extraction program 61 for structured documents is executed to compare the version 262 with a version to be added (for example, a further-revised version 30). The difference extraction results are stored in a correlation table 672. Then, the program 63 for updating multi-version documents is executed to generate a multi-version document 242 to which the contents of the additional version has been added, based on the difference extraction results stored in the correlation table 672.

In the client 2, on the other hand, the program 64 for displaying multi-version documents performs multi-version document display controls such as switching of versions to be displayed, and cross-reference display, while the program 65 for outputting a specific version performs output control of multi-version documents.

Figure 6:
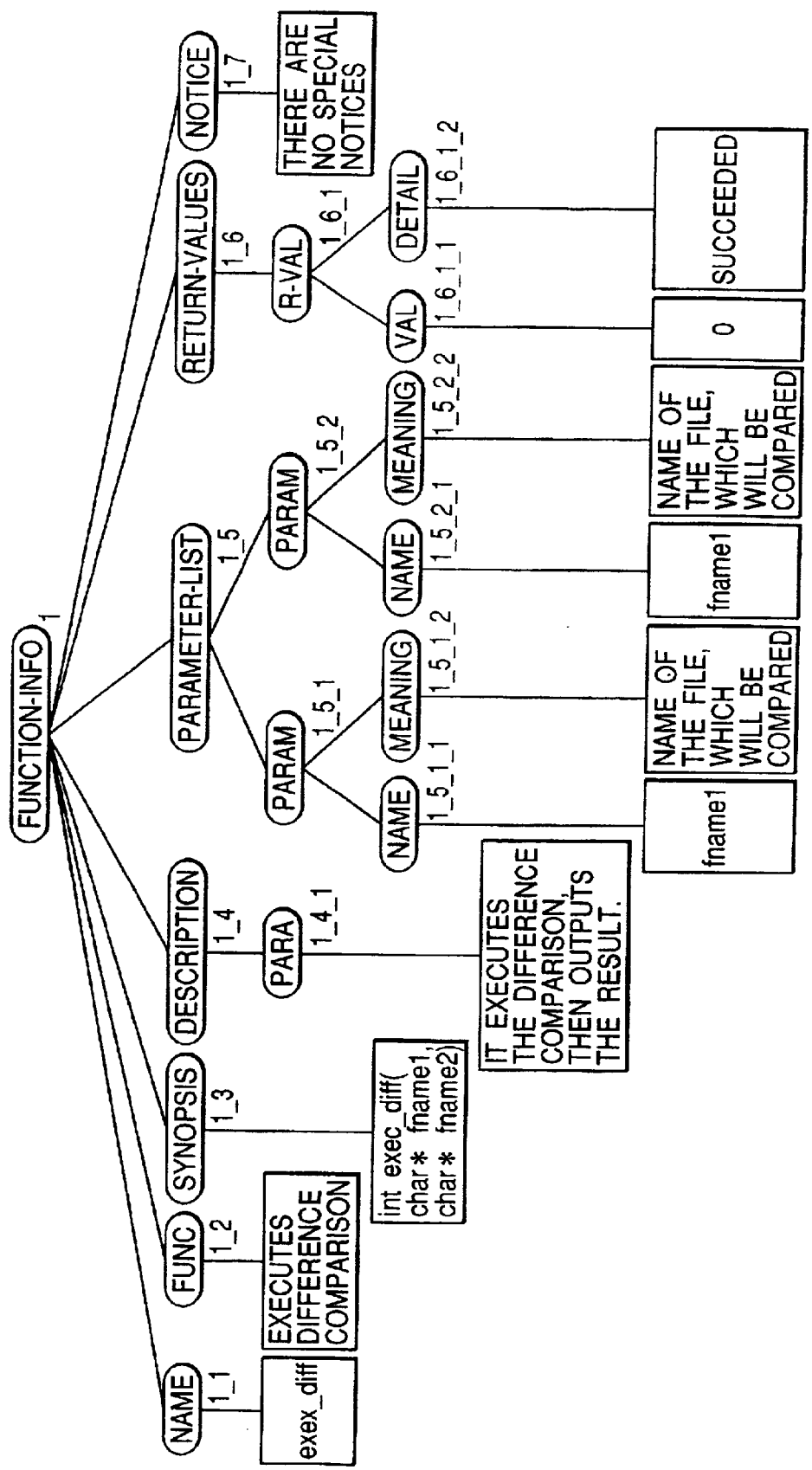
FIG. 6 is a diagram showing a document tree of the programmer's guide V1.

Description will be made of structured document examples used for newly creating or updating a multi-version document. FIGS. 3, 4, and 5 shows programmer's guides V1, V2, and V3 written in a structured document format as document examples which correspond to the original version 20, the revised version 22, and the further-revised version 30 in FIG. 2, respectively. The underlined portions in FIGS. 3 and 4 indicate portions common to both the version V1 and the version V2, while the italicized portions in FIGS. 4 and 5 indicate portions common to both the version V2 and the version V3. A tree structure (referred to as a "document tree") as shown in FIG. 6 is generated by interpreting the structure of the structured document data shown in FIG. 3. A node ID is assigned to each node to uniquely identify every node included in this document tree. In this embodiment, the node ID of the route node is set to "1", and a node ID, such as "1_1" or "1_2", obtained as a result of adding an additional number to the node ID of a parent node is assigned to its child node or a node lower than that. In FIG. 6, the node ID of each node of the document tree is indicated to the lower left of the node.

Description will be made of the process performed on the versions V1 and V2 by the difference extraction program 61 for structured documents.

First, data of the versions V1 and V2 is converted to data suitable for difference extraction processing. To make it easy to compare character strings in the difference extraction process, this embodiment replaces each tag included in a document by a symbol as shown in FIG. 7.

Figure 8:
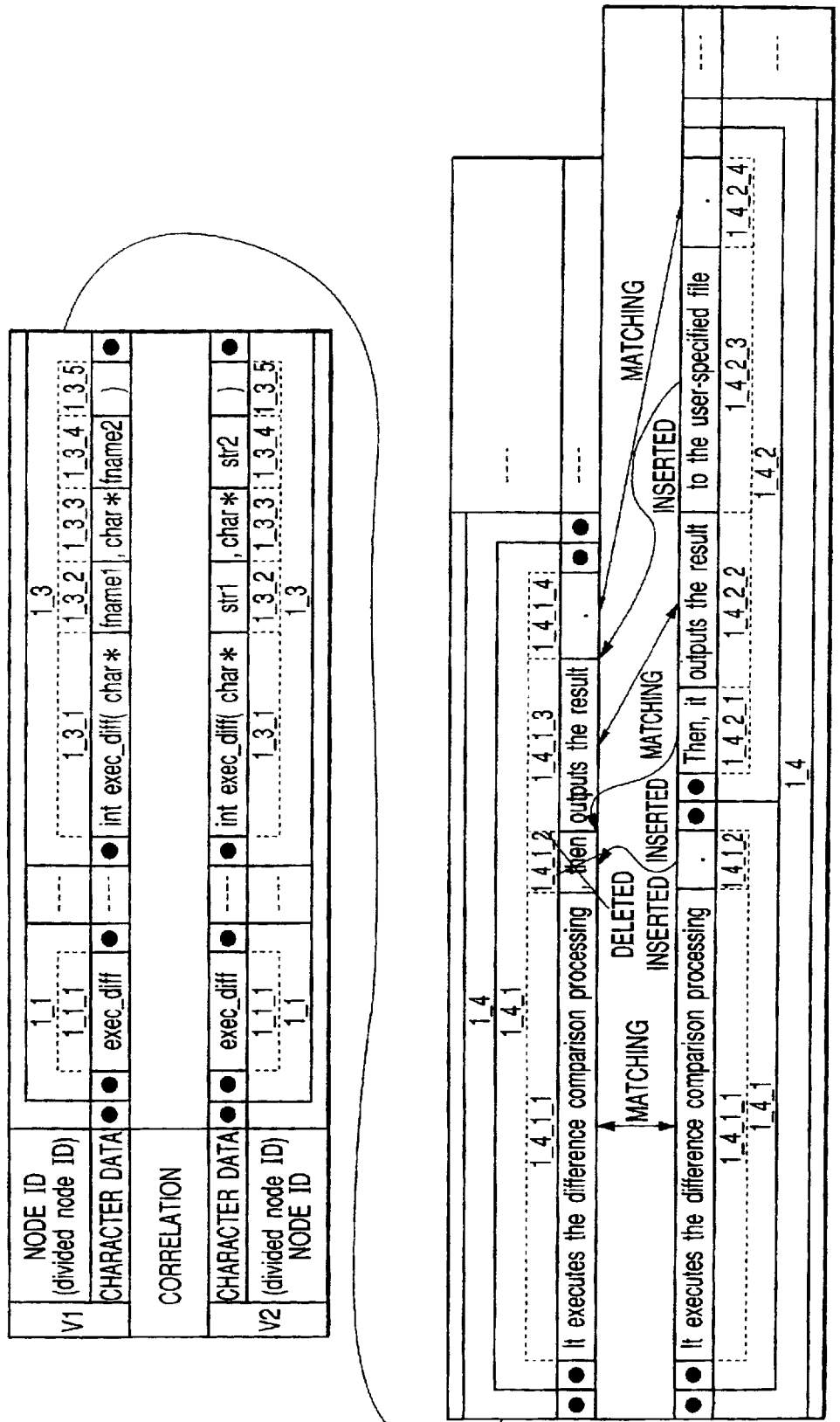
FIG. 8 is a diagram showing difference extraction results between the programmer's guides V1 and V2.

Next, a difference extraction process is performed on the above converted data for difference extraction processing by using a method of extracting difference between structured documents, disclosed in Japanese Laid-Open Patent Publication No. 8-329079 (1996). Difference extraction results as shown in FIG. 8 are obtained. In the figure, for example, the character string "int exec_diff(char*fname1, char*fname2)" of the node 1_3 of the version V1 is divided into five portions such as a common portion "int exec_diff (char*", a difference portion "fname1", another common portion ", char*", another difference portion "fname2", and, finally, still another common portion ")", for classification. These divided portions are hereinafter referred to as divided character strings. Furthermore, each divided character string is given a divided node ID obtained by adding an additional number to the node ID of the node including the divided character string. For example, the five divided character strings of the above node 1_3 are given divided node IDs "1_3_1", "1_3_2", "1_3_3", "1_3_4", and "1_3_5", respectively in the order of their occurrence.

Then, based on coincidence of two divided character strings extracted as common portions, the matching relationship between a pair of nodes each including the respective one of the two divided character strings is extracted. For example, a matching relationship between the node 1_3 of the version V1 and the node 1_3 of the version V2, each node including the respective 1_3_1 node is derived from the coincidence between the divided character string "int exec_diff (char*" of the divided node 1_3_1 of the version V1 and the divided character string "int exec_diff (char*" of the divided node 1_3_1 of the version V2.

After that, relationships between difference portions included in two nodes which have a matching relationship are extracted. For example, the above node 1_3 of the version V1 includes the divided nodes 1_3_1 and 1_3_3, which are portions common to the version V2, and the divided node 1_3_2 ("fname1"), which is a different portion positioned between the two common portions (the divided nodes 1_3_1 and 1_3_3), whereas the node 1_3 of the version V2 includes the divided nodes 1_3_1 and 1_3_3, which are portions common to the version V1, and the divided node 1_3_2 ("str1"), which is a different portion positioned between the common portions (the divided nodes 1_3_1 and 1_3_3). Therefore, the divided nodes 1_3_2 in the versions V1 and V2 each occupy the same position in the respective version. Since these two difference portions both include the character "1", it is determined that the two difference portions correspond to each other, and therefore one difference portion ("fname1" of the version V1) has been changed to the other ("str1" of the version V2) between the two versions V1 and V2. On the other hand, a divided node having no matching relationship between versions, such as the divided node 1_4_1_2 ", then" of the version V1 or the divided node 1_4_1_2 "." of the version V2 is regarded as a deletion or an insertion, respectively.

FIG. 9 shows a correlation table 67-1 storing difference extraction results obtained from the version V1 as a result of the above processing, while FIG. 10 shows a correlation table 67-2 storing difference extraction results obtained from the version V2.

FIG. 11 shows a flowchart of the process performed by the program for generating multi-version documents.

The following description assumes that a multi-version document is to be generated using the above versions V1 and V2.

First, a data normalization process is performed to normalize the contents of the version V1 based on the difference extraction results stored in the correlation table 67-1 at step 6202. FIG. 13 shows the normalized contents of the version V1. In the figure, all tags and text character strings included in the structured document are sandwiched between each pair of version description tags in units of common portions or difference portions. A pair of version description tags are used to discriminate each piece of data gathered and grouped for each version in a multi-version document. The pair of version description tags have attributes which hold version information and other information on data sandwiched by the pair of version description tags. This embodiment uses a type of version description tag to which the XML namespace is applied; specifically the tags starting with "<diff:ver" in FIG. 13. For example, the text character string of the divided node 1_4_1_1 of the version V1 is expressed as "<diff:ver vnum='1' node ID='1_4_1_1'> It executes the difference comparison processing</diff:ver>". In the version description tag, "vnum" indicates the version attribute while "nodeID" indicates the node attribute. The entry line "<function-list xmlns:diff='http://www.xxx.yyy/diff/'>" at the top of FIG. 13 is a namespace declaration which declares that the namespace "diff" is applied to all structures following the phrase "function-list". With this namespace declaration, it is possible to embed version description tags in a structured document having any structure without worrying about duplication of tag names. It should be noted that only processing systems which know the namespace "diff" can process the above version description tags.

Next, based on information on the common portions included in the correlation table 67-1, a version number of 2 is added to the version attribute of each pair of version description tags parenthesizing a common portion in the normalized data, and the value of the "corresponding divided node ID" field 6712 is added to the node attribute at step 6206. For example, since the divided node 1_4_1_1 of the version V1 is a common portion, the entry line of the divided node 1_4_1_1 of the version V1 is rewritten by an entry line such as: "<diff:ver vnum='1 2' nodeID='1_4_1_1 1_4_1_1'> It executes the difference comparison processing</diff:ver>".

Then, based on information on the difference portions included in the correlation table 67-2, new difference portion structures are generated at step 6210 by performing steps of: parenthesizing each difference portion with a pair of version description tags; setting its version attribute to the version number "2"; setting its node attribute to the value of the divided node ID field 6722; and setting its difference class attribute to the value of the difference type field 1209. For example, with respect to the difference portion "to the user-specified file" (the divided node 1_4_2_2) belonging to the node 1_4_2 of the version V2, a new difference portion structure (line) "<diff:ver vnum='2' nodeID='1_4_2_2' desc='insertion'>to the user-specified file</diff:ver>" is generated.

After that, the above generated new difference portion structures are inserted at proper positions determined based on relationships between the nodes included in the normalized data at step 6212. For example, it can be seen from the values of the "corresponding divided node ID" fields 1212 in the correlation table 67-2 that the above difference portion "to the user-specified file" belonging to the node 1_4_2 of the version V2 is inserted between the divided nodes 1_4_1_3 and 1_4_1_4 in the version V1. Therefore, its new difference portion structure is inserted at a position immediately before the version description tag whose version attribute and node attribute are "1" and "1_4_1_4" respectively in the normalized data.

A multi-version document as shown in FIG. 14 is generated by the above process. It may not be necessary to strictly manage node relationships between different versions depending on the type of a multi-version document to be created. If it is not necessary to strictly manage the node relationships, the node attribute and the difference class attribute may be omitted. For further simplification, version description tags common to both versions V1 and V2 may be omitted.

Figure 12:
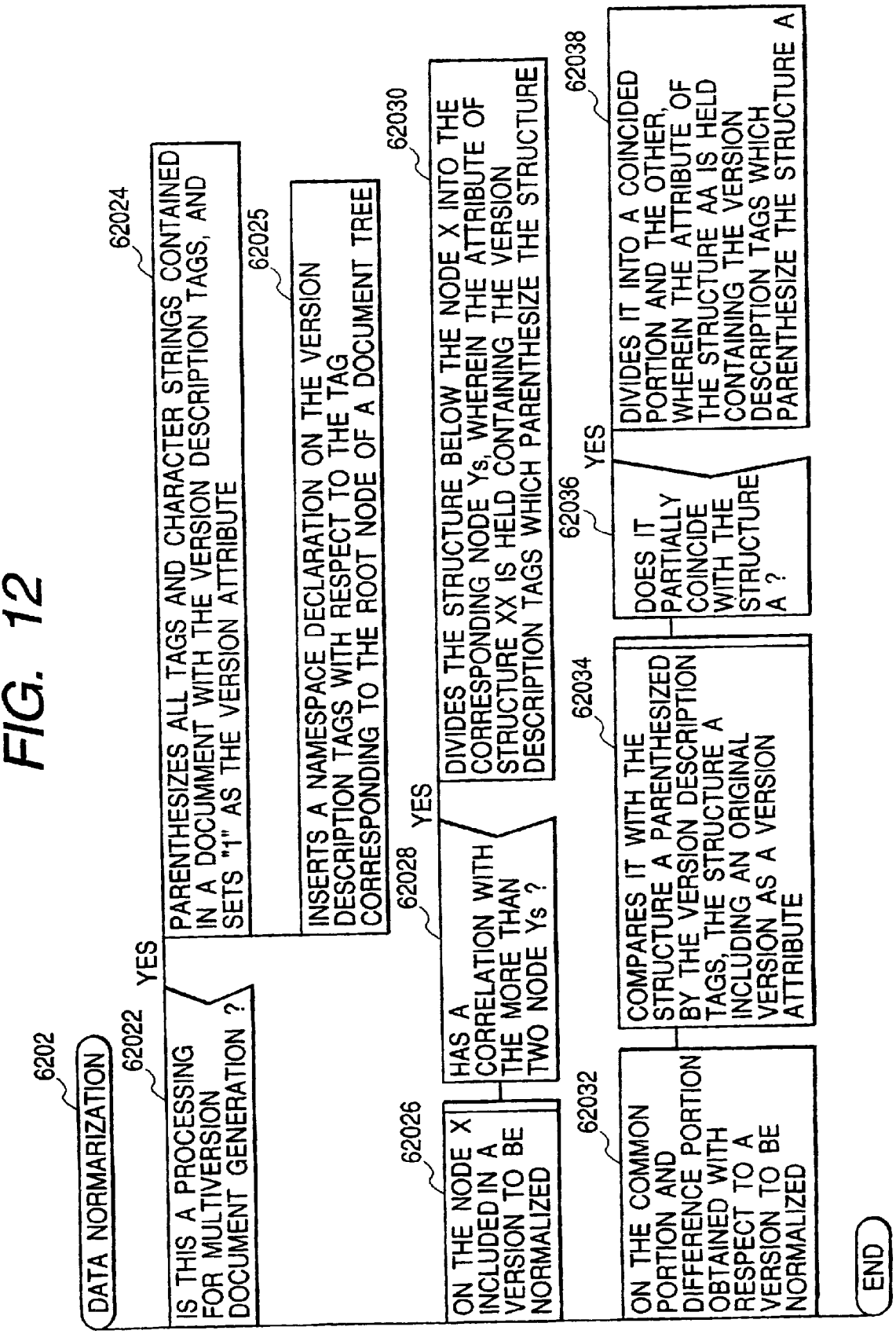
FIG. 12 is a PAD diagram of a data normalization program.

FIG. 12 shows a flowchart of the process performed by the data normalization program.

The following description assumes that the contents of the version V1 is to be normalized based on difference extraction results between the versions V1 and V2.

If the process of newly creating a multi-version document is to be performed (step 62022), all tags and text character strings included in the document are parenthesized with each pair of version description tags, and its version attribute is set to "1" at step 62024. Furthermore, a namespace declaration concerning version description tags is inserted with respect to the tag corresponding to the route node of the document tree at step 62025. With this, the above entry line "<para> It executes the difference comparison processing, then outputs the result.</para>" of the node 1_4_1 of the version V1 is rewritten by the entry line "<diff:ver vnum='1'><para><diff:ver vnum='1'> It executes the difference comparison processing, then outputs the result.</diff:ver></para></diff:ver>", and the start tag "<function_list>" of the route node is also rewritten by the entry line "<function list xmlns:diff='http://www.xxx.yyy/diff/'>".

Next, referring to relationships between nodes included in the correlation table 67-1 (indicated by the node ID field 6711 and the "corresponding node ID" field 6718), it is determined whether, on each node belonging to the normalization-target version (in this case, the version V1) (62026), it matches two or more nodes of the other version (in this case, the version V2) at step 62028. If there is a node of the version V1 which is associated with two or more nodes of the version V2, the normalized entry line of the node is divided into the corresponding node Ys with the attribute of structure XX including the parenthesizing version description tags unchanged at step 62030. For example, the node 1_4_1 of the version V1 is associated with the two nodes 1_4_1 and 1_4_2 of the version V2 as shown in FIG. 9.

Therefore, the above normalized entry line (the node 1_4_1 of the version V1) is replaced by the two normalized entry lines "<diff:ver vnum='1'><para><diff:ver vnum='1'> It executes the difference comparison processing</diff:ver></para></diff:ver>" and "<diff:ver vnum='1'><para><diff:ver vnum='1'>, then outputs the result.</diff:ver></para></diff:ver>", which are obtained as a result of dividing the above original normalized entry line at a position between the nodes 1_4_1 and 1_4_2.

Next, on the common portion and the difference portion relating to the version to be normalized in the correlation table 67-1 (62032), if the common portion and the difference portion coincide partially with the structure A parenthesized by version description tags wherein the structure A includes the version to be normalized as a version attribute (62036), they are divided into a coincided portion and the other, with the attribute of the structure AA unchanged wherein the attribute of the structure AA is held containing the version description tags which parenthesize the structure A (62038). For example, since the above normalized entry line "<diff:ver vnum='1'>outputs the result. </diff:ver>" includes a common portion "outputs the result" and difference portion "." extracted separately in the correlation table 67-1, the normalized entry line is replaced by two normalized entry lines "<diff:ver vnum='1'>outputs the result </diff:ver>" and "<diff:ver vnum='1'>.</diff:ver>". Normalized data as shown in FIG. 13 is generated by the above process.

FIG. 17 shows a flowchart of the process performed by the program for updating multi-version documents.

The following description assumes that the contents of a newly revised version V3 is to be added to a multi-version document generated from the versions V1 and V2.

Figure 16:
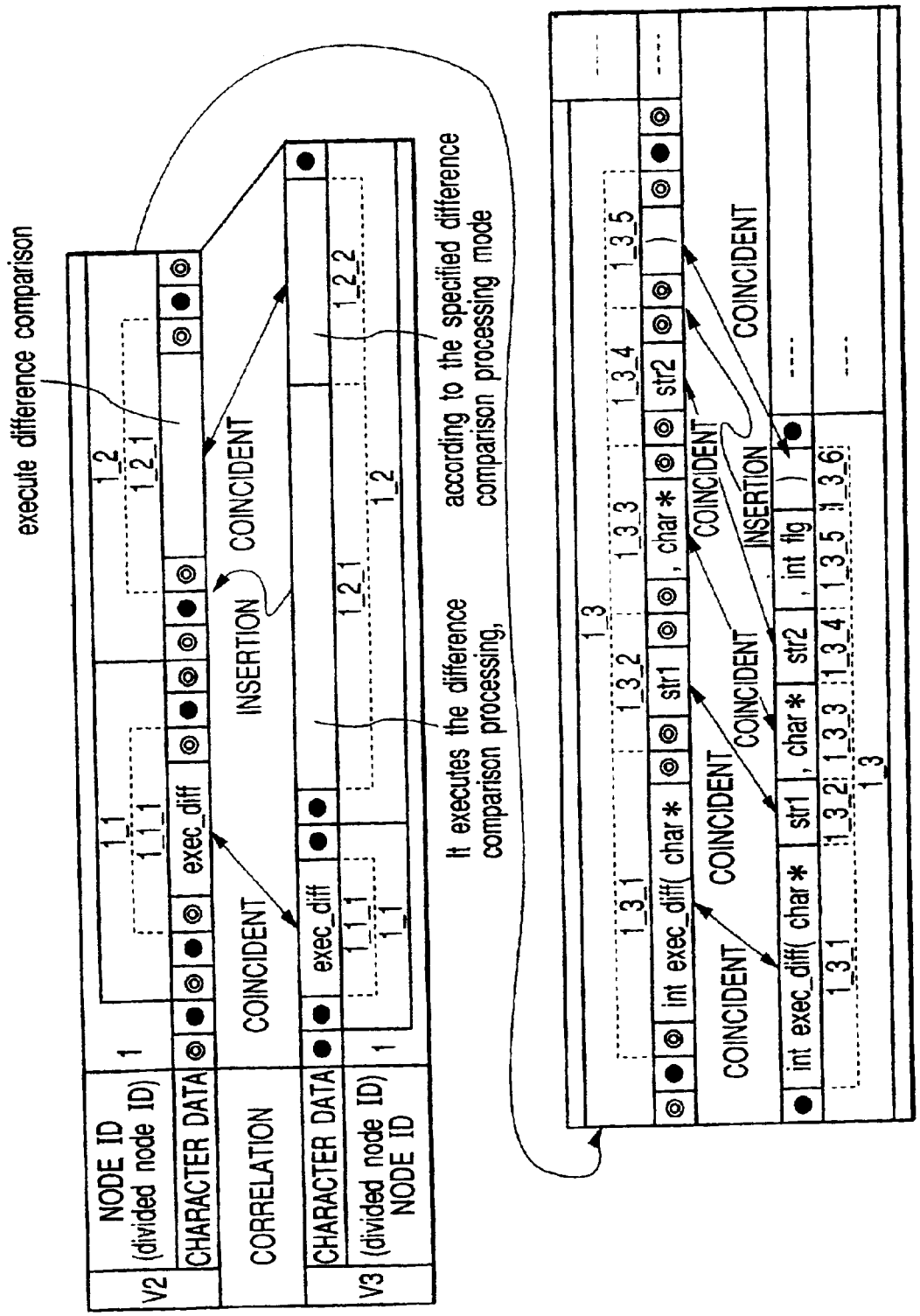
FIG. 16 is a diagram showing difference extraction results between the tag-attached version V2a and the programmer's guide V3.

It is assumed that the difference extraction program for structured documents was already performed on both the latest version (in this case, the version V2) included in the multi-version document to be updated and the version to be added (in this case, the version V3), beforehand, to obtain the difference extraction results. It should be noted that FIG. 15 shows data (a tag-attached version V2a) obtained as a result of extracting the contents of the latest version (version V2) including the version description tags incorporated in the multi-version document, and the tag-attached version V2a is used as a comparison target, instead of the version V2 shown in FIG. 4. FIG. 16 shows an example of difference extraction results obtained by comparing V2a with V3. In FIG. 16, each version description tag is the one replaced by a symbol different from that used to indicate each tag included in the original document so as to discriminate one from the other.

Description will be made of the process of updating a multi-version document based on the above difference extraction results.

First, based on information on common portions and difference portions included in the correlation table for the version V2a, a data normalization process is performed on the version V2a included in the multi-version document at step 6302. Next, based on information on common portions included in the correlation table for the version V2a, on each pair of version description tags parenthesizing common portions in the normalized data (6304), a version number of 3 is added to the version attribute and a corresponding divided node ID is added to the node attribute at step 6306. Then, based on information on difference portions included in the correlation table for the version V3, on each difference portion (6308), new difference portion structures are generated at step 6310 by performing steps of: parenthesizing the difference portion with a pair of version description tags; setting its version attribute to the version number "3"; setting its node attribute to the divided node ID; and setting its difference class attribute to the difference type. After that, above new difference structures are inserted at proper positions determined based on relationships between nodes included in the normalized data at step 6312. A multi-version document as shown in FIG. 18 is generated by the above process.

Figure 19:
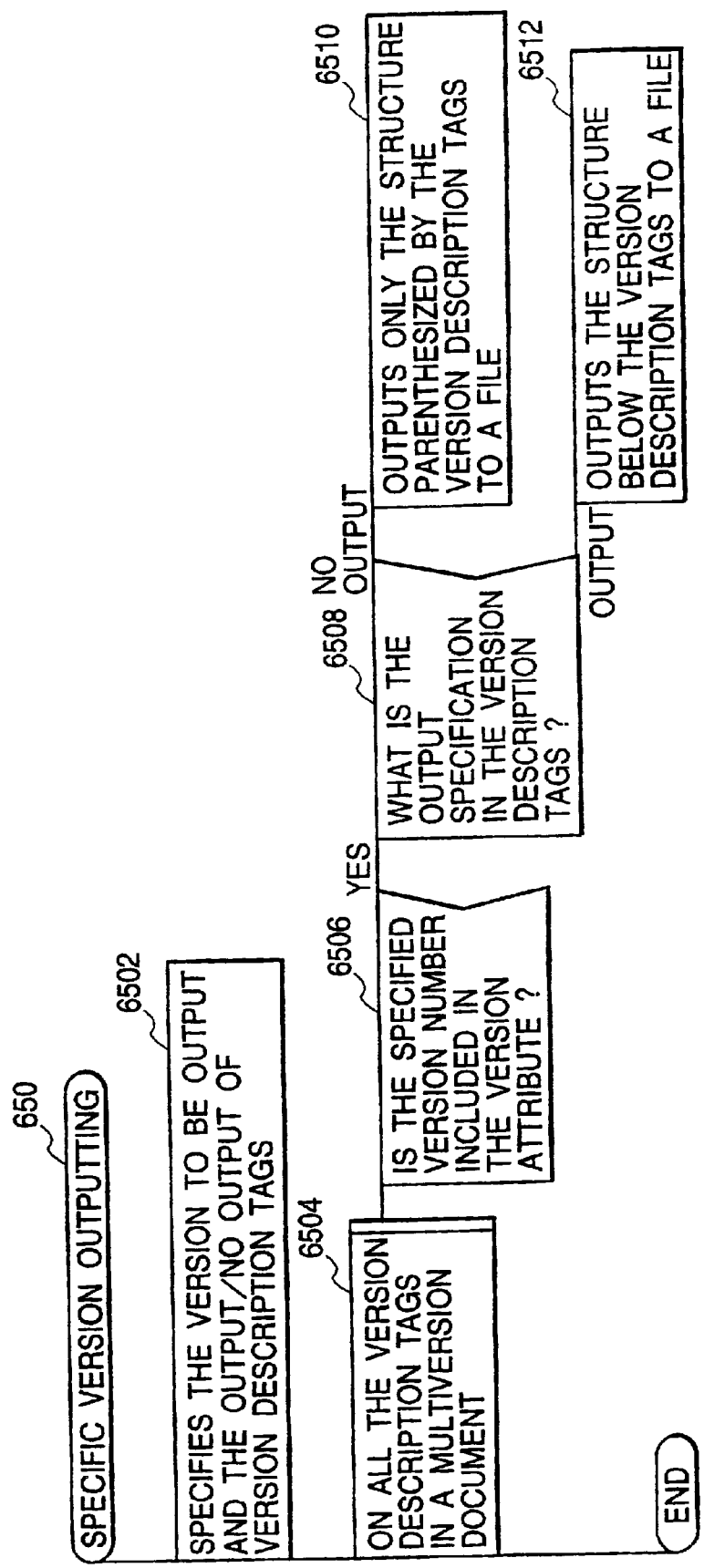
FIG. 19 is a PAD diagram of a program for outputting a specific version.

FIG. 19 shows a flowchart of the process performed by the program for outputting a specific version.

First, the program for outputting a specific version receives the version number of a version to be output, and an instruction as to whether version description tags must be output at the time of outputting data at step 6502. The program for outputting a specific version then checks whether the received version number is included in the version attributes of each pair of version description tags in a multi-version document at step 6506, and outputs the structure belonging to each pair of version description tags which includes the received version number, if any, according to the above received instruction (as to whether version description tags must be output). If the received instruction instructs no version description tags to be output, only the internal structure parenthesized by each pair of version description tags which includes the received version number is output at step 6510; otherwise (if version description tags must be output) the structure belonging to each pair of version description tags which includes the received version number is output to a file including the pair of version description tags itself at step 6512. That is, if the instruction requests that no version description tags be output, the original data of each version used to generate the multi-version document is output. If version description tags must be output, on the other hand, each tag-attached version is output.

Figure 20:
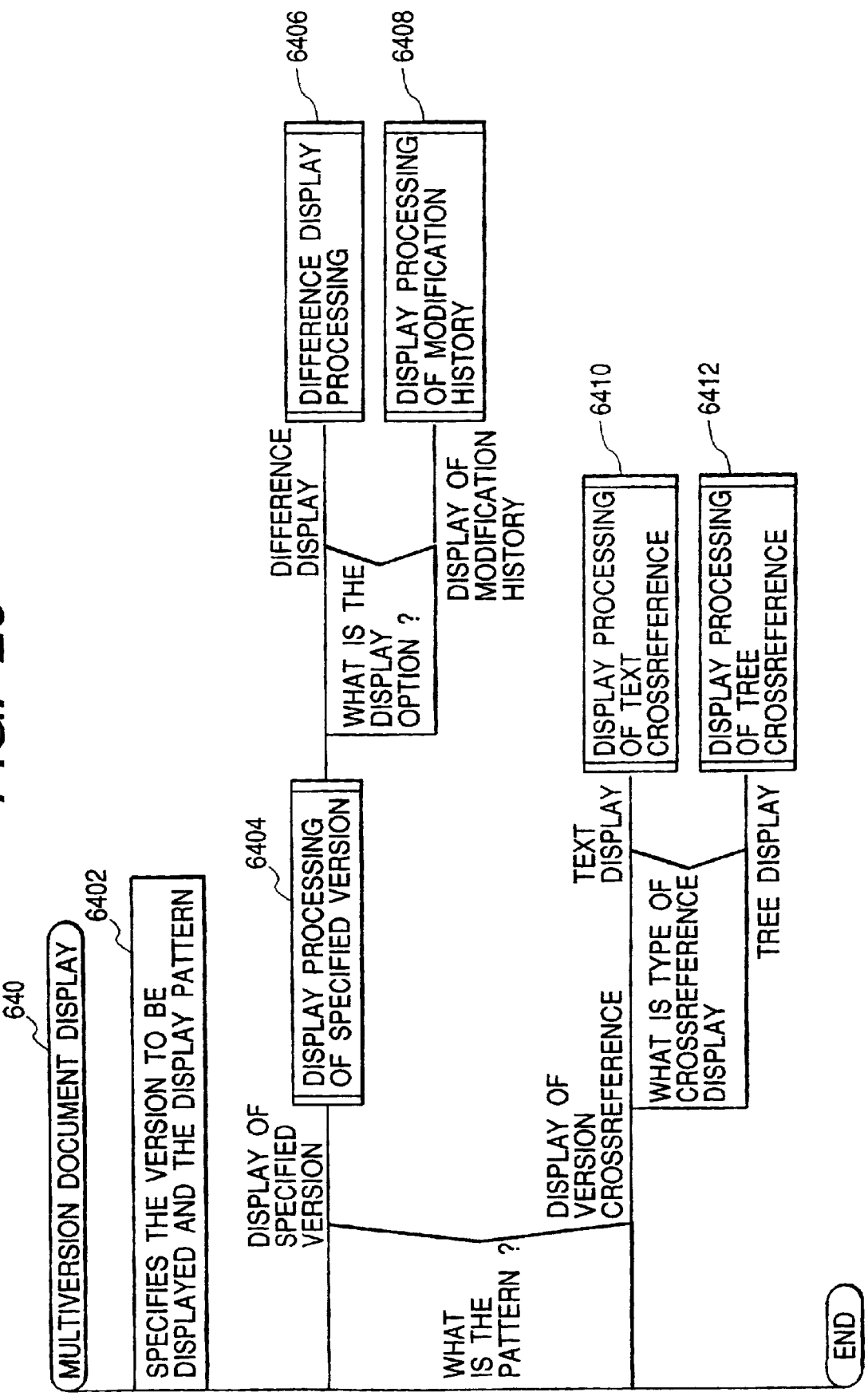
FIG. 20 is a PAD diagram of a program for displaying multi-version documents.

FIG. 20 shows a flowchart of the process performed by the program for displaying multi-version documents.

First, the program for displaying multi-version documents receives an instruction as to which version must be displayed using which display pattern, at step 6402. This embodiment uses two display patterns: the "display of specified version", in which the contents of a single version are displayed, and the "display of version cross-reference", in which a plurality of versions are displayed at the same time for comparison. The "display of version cross-reference" provides two options: the text cross-reference display, in which version contents are displayed and compared using text, and the tree cross-reference display, in which version contents are displayed and compared using their document trees. Furthermore, the "display of specified version" has display options such as the "difference display" option, which highlights changes made to a specified range of versions such as a range from the version v2 through the version V3, and the "display of modification history" option, which displays the change history of the highlighted changes.

If the "display of specified version" is specified as the display pattern, a specified version is displayed on the screen by referring to the version attribute of each pair of version description tags in a multi-version document in the "display processing of specified version" (6404).

Figure 21:
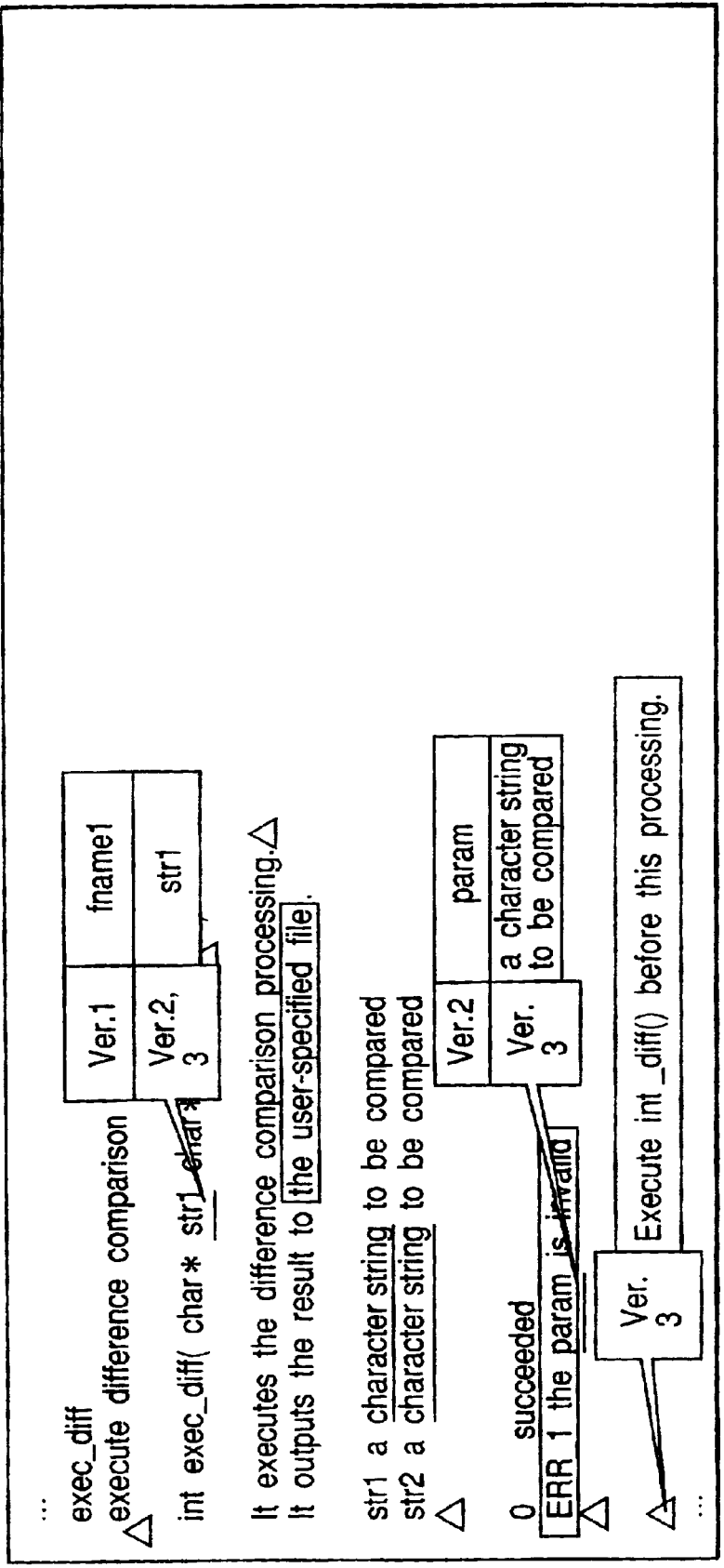
FIG. 21 is a diagram showing a difference/modification-history display example of a multi-version document.

Further, if the "difference display" is selected as an option of the above "display of specified version" with a range of versions specified, the "difference display processing" (6406) highlights the structure belonging to each pair of version description tags whose version attribute satisfies the specified range of versions (that is, the version indicated by the first value of the version attribute is included in the specified range of versions) in the multi-version document to indicate the differences. Still further, if the "display of modification history" is selected to display the change history of the above differences, the "display processing of modification history" (6408) generates a change history list of character stings obtained as a result of extracting the character string parenthesized by each pair of version description tags whose node attribute is the same as that of the pair of version description tags parenthesizing the above differences in the multi-version document, and displays the change history list in a pop-up window. FIG. 21 shows a screen example obtained as a result of selecting the above options "difference display" and "display of modification history".

Figure 22:
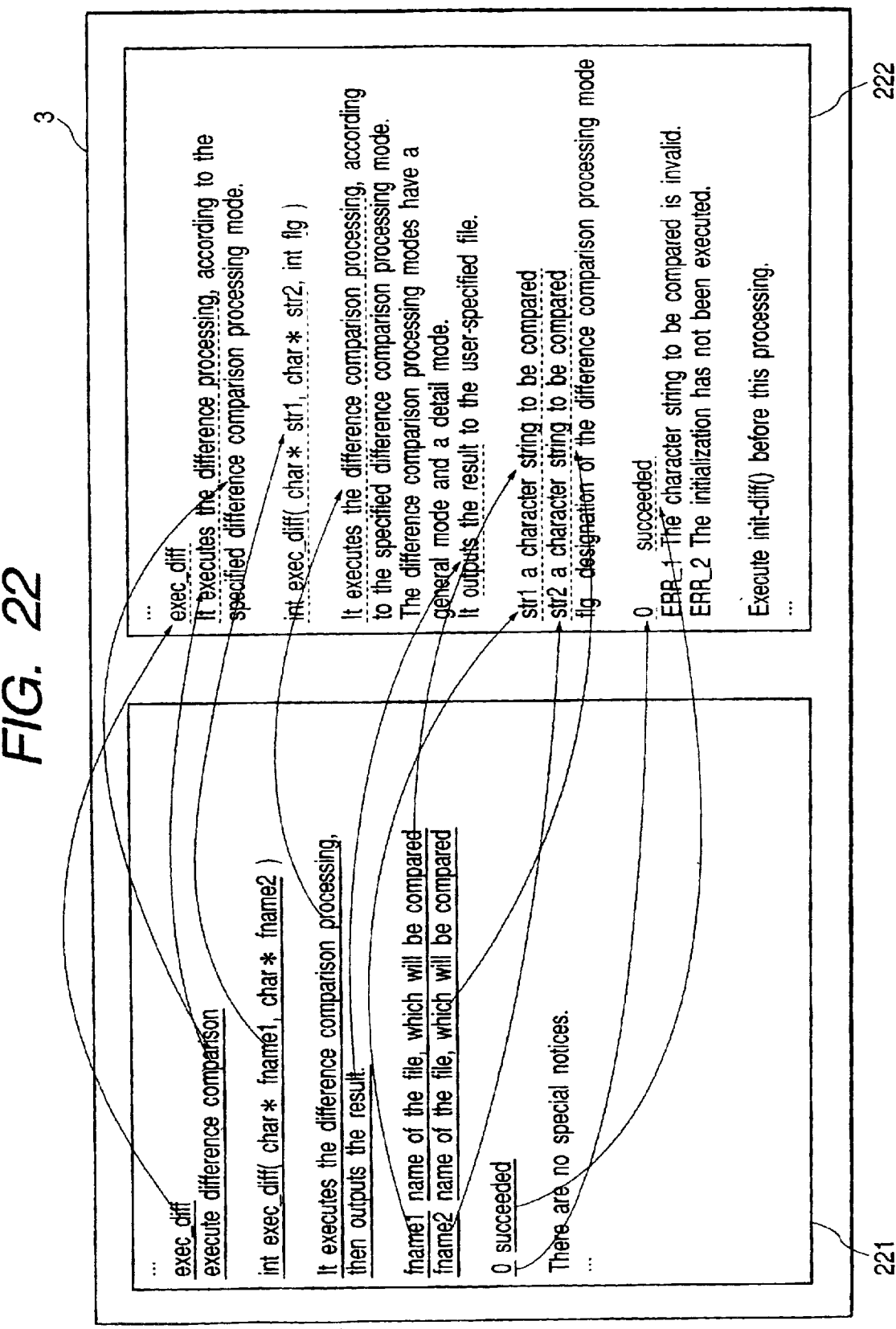
FIG. 22 is a diagram showing a text cross-reference display example of a multi-version document.

If the text cross-reference display option of the "display of version cross-reference" is selected as the display pattern, the "display processing of text crossreference" (6410) obtains matching relationships between nodes in the multi-version document based on the version attribute and the node attribute of each pair of version description tags and displays a screen as shown in FIG. 22 using the obtained matching relationships.

Figure 23:
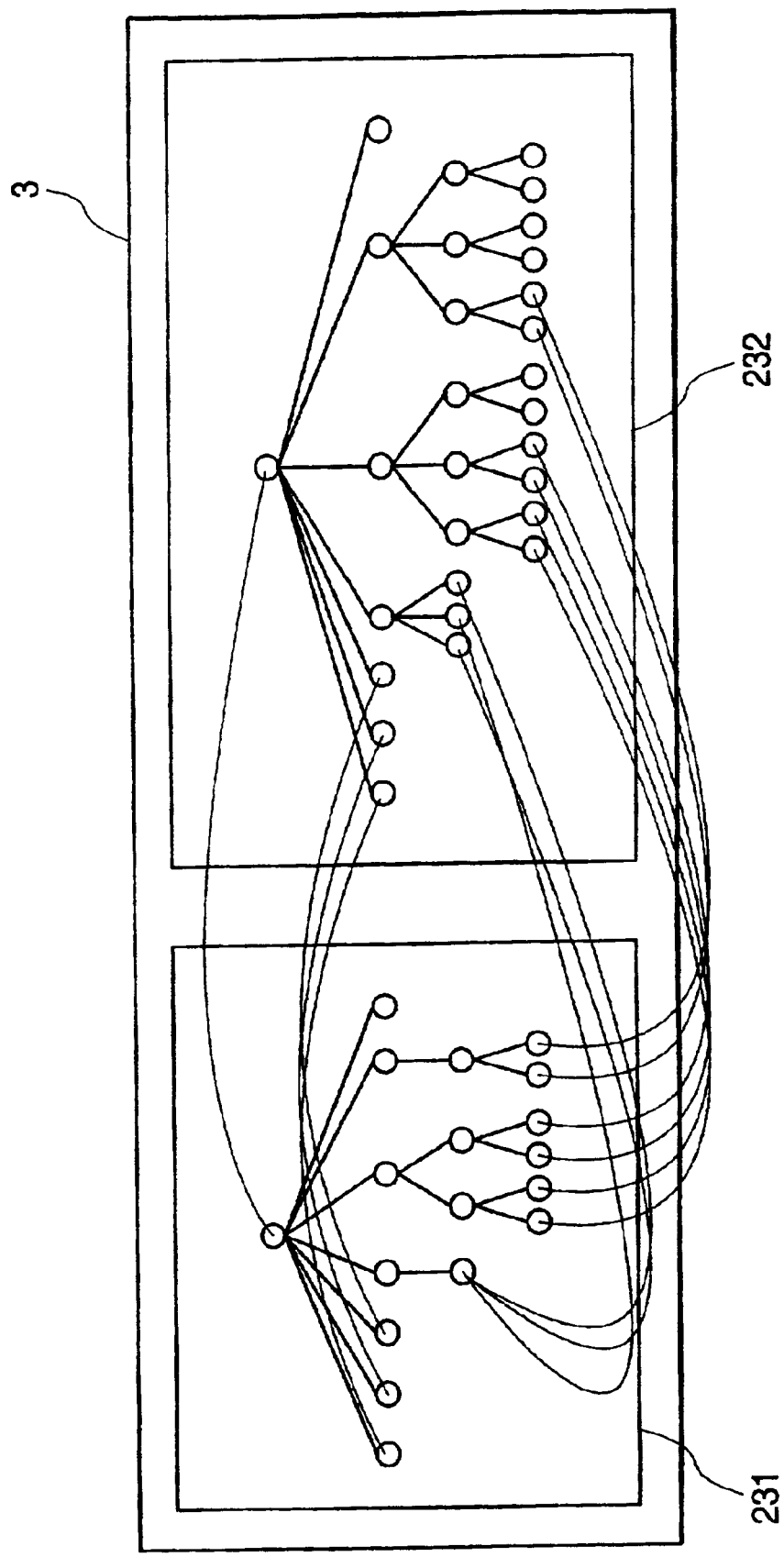
FIG. 23 is a diagram showing a tree cross-reference display example of a multi-version document.

FIG. 22 shows a screen displaying the contents of the version V1 in its display area 221 and the contents of the version V2 in its display area 222. It should be noted that it is possible to employ a display control in which clicking on the character string "fname1" in the display area 221 displays the corresponding character string "str1", which is currently displayed in the display area 222, at the center of a display area 392. If the tree cross-reference display is specified as the display pattern, the "display processing of tree cross-reference" (6412) displays a cross-reference display corresponding to the cross-reference display in FIG. 22, using document trees as shown in FIG. 23.

This completes the description of the first embodiment.

The first embodiment extracts portions common to versions of a document, which are generated each time the document is revised, and adds portions specific to each version to the extracted common portions to generate a multi-version document of the XML format in which the contents of a plurality of versions are efficiently expressed, making it possible to reduce the amount of data necessary for version management, and facilitate exchange of data of a plurality of versions on a network. Furthermore, regarding all structures and text character strings included in a multi-version document, the first embodiment indicates the matching relationships of structures and text character strings belonging to one version with those belonging to another. By obtaining these matching relationships, it is possible to reproduce a given version, highlight changes (difference), and list the structures and text character strings in versions corresponding to a portion (a structure and text character strings) in a target version to which each change was made using the "display of modification history" function, making it easy for the user to grasp changes made to a document and the times when these changes were made.

A second embodiment of the present invention will be described below.

Figure 24:
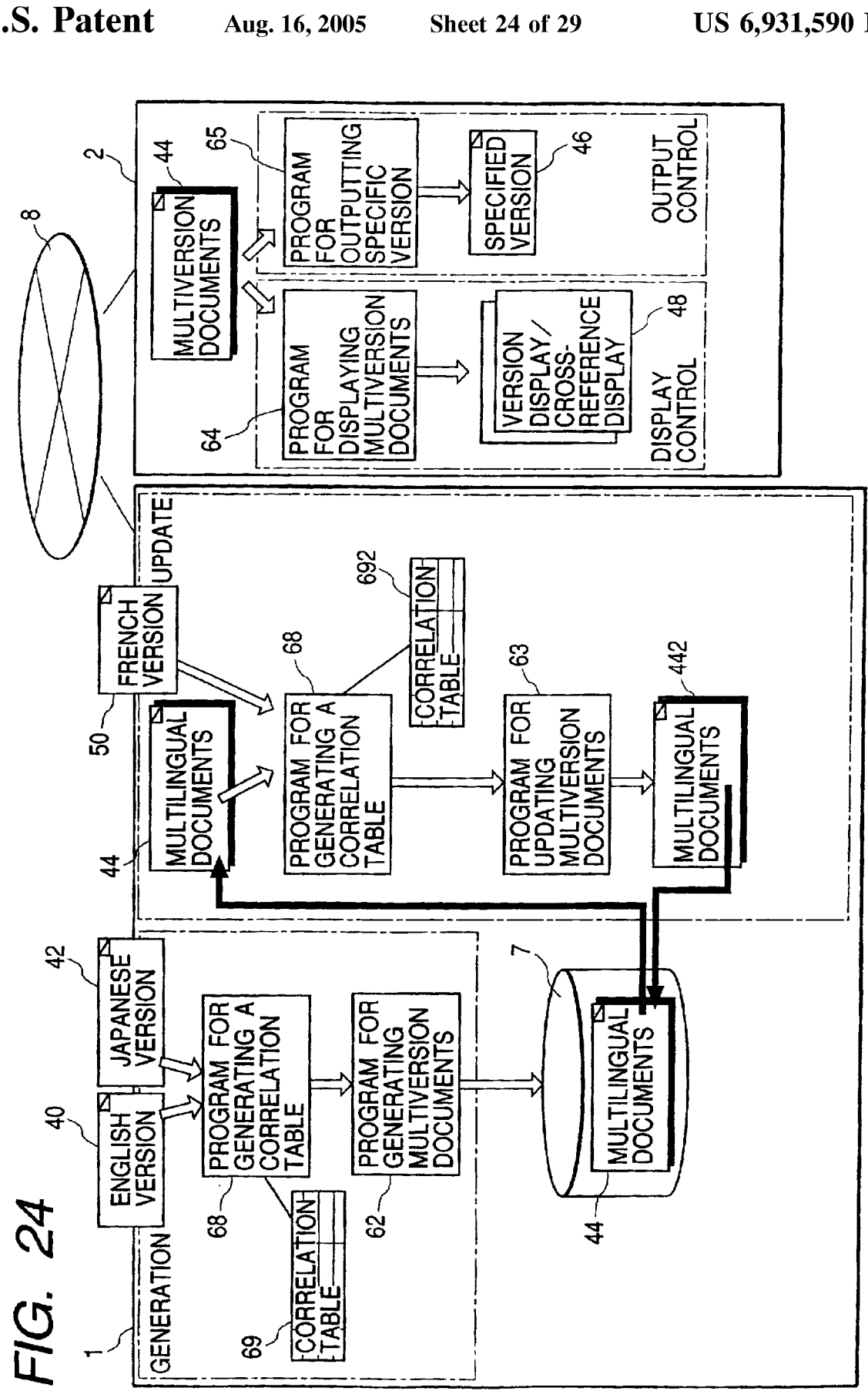
FIG. 24 is a schematic diagram showing processes employed by a second embodiment of the present invention.

FIG. 24 schematically shows processes employed by the second embodiment. The object of the second embodiment is to generate a multilingual document which expresses a plurality of versions in a single document each written in a different description language but having the same document structure, as represented by an English version whose contents are written in English, and its Japanese version obtained by translating the English version. Since each version has the same document structure, it is possible to match nodes included in one version with those included in another. Therefore, unlike the first embodiment, the second embodiment does not require the difference extraction program for structured documents to obtain the matching relationships between versions. However, the second embodiment has a program 68 for generating a correlation table to generate a correlation table 69, instead.

The process of newly creating a multilingual document according to the second embodiment proceeds as follows. First, the program 68 for generating a correlation table is executed on an English version 40 and its Japanese version 42 to generate the correlation table 69. Then, the program 62 for generating multi-version documents is executed to generate a multi-version document 44 which expresses the contents of both versions in a single file based on the matching relationships stored in the correlation table 69.

Figure 25:
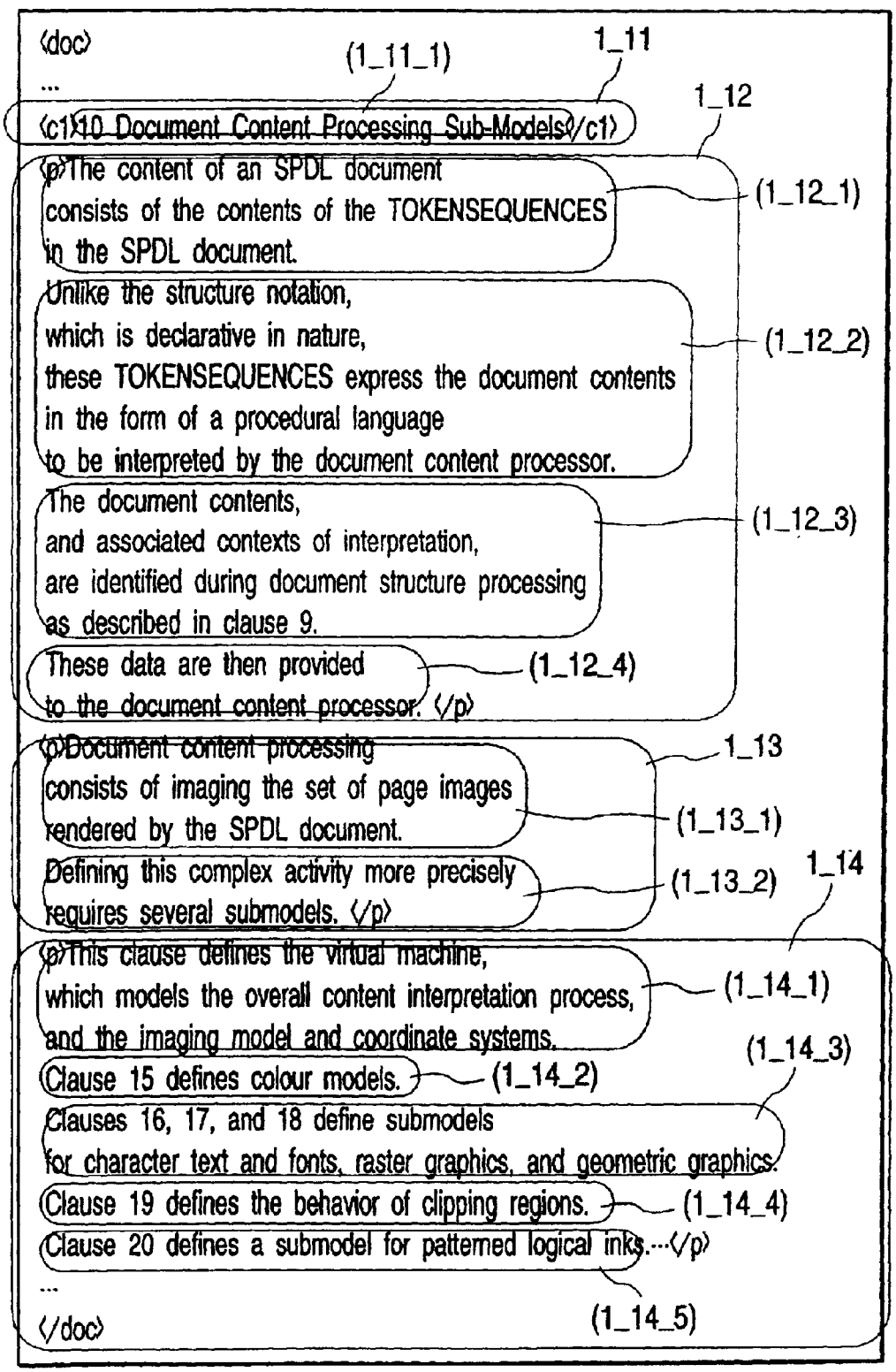
FIG. 25 is a diagram showing an example of structured document data (English version) to be processed according to the second embodiment of the present invention.

FIGS. 25 and 26 show examples of the English version 40 and the Japanese version 42, respectively. FIGS. 27 and 28, on the other hand, show the correlation tables 69 of the English and the Japanese versions, respectively, each expressing relationships between sentences (text character strings each belonging to a node) included in the respective version. Furthermore, FIG. 29 shows an example of a multilingual document generated based on the above relationships. It should be noted that each pair of version description tags includes a version type attribute "vkind" for identifying each description language, instead. In the figure, each portion parenthesized by a pair of version description tags which includes an expression "vkind='e'" belongs to the English version 40, while each portion parenthesized by a pair of version description tags which includes another expression "vkind='j'" belongs to the Japanese version 42.

The process of adding the contents of a French version 50 written in French and having the same document structure as those of the English and the Japanese versions to the above generated multilingual document (updating the multilingual document) proceeds as follows. After generating a correlation table 692 which stores the relationship between the French version 50 and one of the two versions included in the above multilingual document, the program for updating multi-version documents is executed. This execution generates a multilingual document including the English, the Japanese, and the French versions.

The client 2 obtains a multilingual document stored in the database 7 using a Web browser program 121, and carries out the same display and output controls as those employed by the first embodiment by regarding the obtained multilingual document as a multi-version document.

This completes the description of the second embodiment.

The second embodiment extracts portions common to versions of a document, which are generated each time the document is revised, and adds portions specific to each version to the extracted common portions to generate a multi-version document of the XML format in which the contents of a plurality of versions are efficiently expressed, making it possible to reduce the amount of data necessary for version management, and facilitate exchange of data of a plurality of versions on a network. Furthermore, regarding all structures and text character strings included in a multi-version document, the second embodiment indicates the matching relationships of structures and text character strings belonging to one version with those belonging to another. By obtaining these matching relationships, it is possible to reproduce a given version, highlight changes (difference), and list the structures and text character strings in versions corresponding to a portion (a structure and text character strings) in a target version to which each change was made using the "display of modification history" function, making it easy for the user to grasp changes made to a document and the times when these changes were made.

Since the present invention can display a plurality of versions of a document by showing changes made to each version, the user can easily grasp changes in the contents of the versions.

What is claimed is:

1. A method for generating a multi-version document using an original version and a revised version of a structured document, said structured document including one or more tree structures, each said tree structure including one or more hierarchically arranged nodes, each said node having a start tag and an end tag, said method comprising the steps of:

extracting common portions included commonly in both the original version and the revised version of the structured document, and difference portions specific to either the original version or the revised version, by recognizing each node element between its start tag and its end tag, each of said common portions and said difference portions having a node identifier attached thereto identifying the node or a part of the node and text character strings included in the document; and creating said multi-version document based on the extraction result, wherein said multi-version document includes:

said extracted common portions each having a version description tag attached thereto, said version description tag including version identifiers of the original version and the revised version and the node identifier of the common portion; and said extracted difference portions each having a version description tag attached thereto, said version description tag including a version identifier of a version which includes the difference portion, the node identifier of the difference portion, and information specifying whether the difference portion was generated as a result of insertion or modification.

2. The method for generating a multi-version document as claimed in claim 1, said method further comprising a step of: when a further-revised version is created, performing said extraction and said creation using a latest version included in said multi-version document and said further-revised version to create a new multi-version document.

3. The method for generating a multi-version document as claimed in claim 2, wherein said new multi-version document is written in an XML format.

4. The method for generating a multi-version document as claimed in claim 2, said method further comprising a step of: displaying any arbitrary version based on said new multi-version document.

5. The method for generating a multi-version document as claimed in claim 2, said method further comprising a step of:
   displaying difference between a specified version and another version based on said multi-version document, said difference including the version identifier and its corresponding text character string for each displayed version.

6. The method for generating a multi-version document as claimed in claim 2, wherein an XML namespace is applied to said version description tag.

7. A system for generating a multi-version document using an original version and a revised version of a structured document, said structured document including one or more tree structures, each tree structure including one or more hierarchically arranged nodes, each node having a start tag and an end tag, said system comprising:

means for extracting common portions included commonly in both the original version and the revised version of the structured document, and difference portions specific to either the original version or the revised version, by recognizing each node element between its start tag and its end tag, each of said common portions and said difference portions having a node identifier attached thereto identifying the node or a part of the node and text character strings included in the document; and means for creating said multi-version document based on the extraction result, wherein said multi-version document includes:

said extracted common portions each having a version description tag attached thereto, said version description tag including version identifiers of the original version and the revised version and the node identifier of the common portion; and said extracted difference portions each having a version description tag attached thereto, said version description tag including a version identifier of a version which includes the difference portion, the node identifier of the difference portion, and information specifying whether the difference portion was generated as a result of insertion or modification.

8. The system for generating a multi-version document as claimed in claim 7, said system further comprising: means for, when a further-revised version is created, performing said extraction and said creation using a latest version included in said multi-version document and said further-revised version to create a new multi-version document.

9. The system for generating a multi-version document as claimed in claim 8, wherein said new multi-version document is written in an XML format.

10. The system for generating a multi-version document as claimed in claim 8, said system further comprising: means for displaying any arbitrary version based on said new multi-version document.

11. The system for generating a multi-version document as claimed in claim 8, said system further comprising: means for displaying difference between a specified version and another version based on said multi-version document, said difference including the version identifier and its corresponding text character string for each displayed version.

12. The system for generating a multi-version document as claimed in claim 8, wherein an XML namespace is applied to said version description tag.

13. The method for generating a multi-version document as claimed in claim 1, said method further comprising a step of:
  displaying a change history list of the text character strings for the same node with the corresponding version identifiers attached thereto.

14. The system for generating a multi-version document as claimed in claim 7, said system further comprising:
  means for displaying a change history list of the text character strings for the same node with the corresponding version identifiers attached thereto.

\* \* \* \* \*